US012280375B2

(12) United States Patent
Jasperse et al.

(10) Patent No.: US 12,280,375 B2
(45) Date of Patent: Apr. 22, 2025

(54) ACOUSTOPHORESIS DEVICES HAVING CONDUCTIVE ELECTRODES AND METHODS

(71) Applicant: Siemens Healthcare Diagnostics Inc., Tarrytown, NY (US)

(72) Inventors: Jeffrey Jasperse, Newton, MA (US); Peter Paulicka, Forchheim (DE); Michael Palombo, South Boston, MA (US); Ramona Seliger, Wiesenttal-Muggendorf (DE); Paul Benson, Quincy, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/705,197

(22) PCT Filed: Oct. 10, 2022

(86) PCT No.: PCT/US2022/077832
§ 371 (c)(1),
(2) Date: Apr. 26, 2024

(87) PCT Pub. No.: WO2023/244275
PCT Pub. Date: Dec. 21, 2023

(65) Prior Publication Data

US 2024/0416346 A1 Dec. 19, 2024

Related U.S. Application Data

(60) Provisional application No. 63/366,552, filed on Jun. 17, 2022.

(51) Int. Cl.
*B01L 3/00* (2006.01)
*C12M 1/00* (2006.01)

(52) U.S. Cl.
CPC . *B01L 3/502761* (2013.01); *B01L 2300/0816* (2013.01); *B01L 2400/0436* (2013.01); *B01L 2400/0439* (2013.01)

(58) Field of Classification Search
None
See application file for complete search history.

(56) References Cited

U.S. PATENT DOCUMENTS 6,929,750 B2 8/2005 Laurell et al.
9,097,701 B2 8/2015 Krogh
(Continued)

FOREIGN PATENT DOCUMENTS

EP 1060025 B1 10/2003
WO 03079006 A1 9/2003
(Continued)

OTHER PUBLICATIONS

International Search Report and Written Opinion of International Application No. PCT/US2022/077832 dated Jan. 23, 2023.
(Continued)

*Primary Examiner* — Daniel S Larkin

(57) ABSTRACT

An acoustophoresis device having a sample vessel and a piezo transducer is described. The sample vessel has an outer surface, a microchannel within confines of the outer surface, a first port extending through the outer surface to the microchannel, and a second port extending through the outer surface to the microchannel, such that a blood sample is insertable through the first port into the microchannel. The sample vessel has conductive traces on the outer surface. The piezo transducer is bonded to the outer surface of the sample vessel to form a monolithic structure. The piezo transducer contacts at least one of the conductive traces, the piezo transducer is configured to generate ultrasonic waves inside a sample in the microchannel. The piezo transducer has an excitation signal input and response signal output
(Continued)

electrically connected to the at least one of the conductive traces.

42 Claims, 22 Drawing Sheets

(56) References Cited

U.S. PATENT DOCUMENTS

| | | | | |
|---|---|---|---|---|
| 9,512,421 | B1 | 12/2016 | Branch et al. | |
| 11,426,727 | B2 | 8/2022 | Paulicka et al. | |
| 2003/0028108 | A1 | 2/2003 | Miller | |
| 2013/0012927 | A1 | 1/2013 | Schafer | |
| 2022/0113297 | A1 | 4/2022 | Bosy et al. | |
| 2022/0143611 | A1 | 5/2022 | Paulicka et al. | |
| 2022/0355294 | A1* | 11/2022 | Paulicka | B01L 3/502707 |
| 2023/0213414 | A1* | 7/2023 | Jasperse | B01L 3/502715<br>435/287.1 |

FOREIGN PATENT DOCUMENTS

| | | | |
|---|---|---|---|
| WO | 2014133451 | A1 | 9/2014 |
| WO | 2022031459 | A1 | 2/2022 |

OTHER PUBLICATIONS

Doria, Arlene et al., “Rapid Blood Plasma Separation with Air-Liquid Cavity Acoustic Transducers”, Oct. 2011, 3 pages, Seattle, Washington USA.

Lenshof, A. et al., “Emerging Clinical Applications of Microchip-Based Acoustophoresis”, Technology Review, Dec. 2011, 7 pages.

Majedy, Motasam “A microfluidic ultrasonic sample preparation device for bead-based immunoassays”, KTH Engineering Sciences, Jun. 3, 2014, 38 pages.

Palmiotti, C.A. et al., “Continuous Acoustic Separation of Blood Components in Plastic Microfluidic Devices”, Charles Stark Draper Laboratory, Oct. 2014, 3 pages, San Antonio, Texas, USA.

Antfolk, Maria et al., “A single inlet two-stage acoustophoresis chip enabling tumor cell enrichment from white blook cells”, Royal Society of Chemistry, 2015, 8 pages.

Augustsson, Per et al., “Microfluidic, Label-Free Enrichment of Prostate Cancer Cells in Blood Based on Acoustophoresis”, Analytical Chemistry, 2012, 9 pages.

Grenvall, Carl et al., “Concurrent Isolation of Lymphocytes and Granulocytes Using Prefocused Free Flow Acoustophoresis”, Analytical Chemistry, Jun. 2, 2015, 16 pages.

Jakobsson, Ola et al., “Continuous Flow Two-Dimensional Acoustic Orientation of Nonspherical Cells”, Analytical Chemistry, 2014, 4 pages.

Jakobsson, Ola et al., “Thousand-Fold Volumetric Concentration of Live Cells with a Recirculating Acoustofluidic Device”, Analytical Chemistry, 2015, 6 pages.

Johansson, Linda, “Acoustic Manipulation of Particles and Fluids in Microfluidic Systems”, Uppsala University, 2009, 82 pages.

Laurell, Thomas et al., “Chip integrated strategies for acoustic separation and manipulation of cells and particles”, Chemical Society Reviews, Sep. 29, 2006, 15 pages.

Antfolk et al., “Focusing of sub-micrometer particles and bacteria enabled by two-dimensional acoustophoresis”, Royal Society of Chemistry, Lab on a Chip, 2014, 9 pages.

Tojo, Axel, “Free Flow Acoustophoresis: Technology Transfer from Silicon to Glass—Master’s Thesis”, Lund University, Nov. 2012, 61 pages.

Petersson, Filip, “On acoustic particle and cell manipulation in microfluidic systems”, Lund University, Jan. 1, 2007, 88 pages.

Antfolk et al., “Acoustophoresis for Label-Free Separation and Concentration of Cancer Cells”, 18th International Conference on Miniaturized Systems for Chemistry and Life Sciences, 2014, 2 pages.

* cited by examiner

| Absorbance | Transmittance |
|---|---|
| 0 | 1 |
| 0.1 | 0.79 |
| 0.25 | 0.58 |
| 0.5 | 0.32 |
| 0.75 | 0.18 |
| 0.0 | 0.13 |
| 1 | 0.1 |
| 2 | 0.01 |
| 3 | 0.001 |

$T(T)$ Transmitted Power $T_o(T)$ Incident Before Sample $e(T)$ Extinction Coefficient $d$ Sample's Pathlength (at Specific Wavelength)

$$T(\lambda) = T_0(\lambda)e^{-c\varepsilon(\lambda)d}$$

$$Absorption\ Spectrum = -log(\frac{T(\lambda)}{T_0(\lambda)})$$

ACOUSTOPHORESIS DEVICES HAVING CONDUCTIVE ELECTRODES AND METHODS

CROSS-REFERENCE TO RELATED APPLICATION

This application is a national stage application filed under 35 USC § 371 of PCT/US2022/077832, filed Oct. 10, 2022, which claims benefit under 35 USC § 119 (e) of U.S. Provisional Application No. 63/366,552, filed Jun. 17, 2022. The entire contents of the above-referenced patent applications are hereby expressly incorporated herein by reference.

FIELD OF THE DISCLOSURE

The disclosure generally relates to devices, systems, and methods for testing blood samples. More particularly the disclosure relates to a lysis device configured for lysing red blood cells in a sample vessel by means of ultrasonic vibrations, shear forces, pressure, and/or fluid movement, generated in the vessel by an acoustic transducer, such as a piezo transducer, driven at one or more particular excitation frequencies, or a range of frequencies. In some non-limiting embodiments, the ultrasonic waves are generated by a single piezo transducer. The lysis device may be used in conjunction with blood sample testing analyzers.

BACKGROUND

Point-of-care testing refers generally to medical testing at or near the site of patient care, such as in an emergency department or in an operating room. A desired outcome of such tests is often rapid and accurate lab results to determine a next course of action in the patient care. A number of such point-of-care tests involves analysis of a blood sample from the patient. Many of these tests use whole blood, plasma, or serum.

In some tests, the cell walls of red blood cells in the blood sample are ruptured (lysed) to release hemoglobin. Lysis of the red blood cells may also be referred to as hemolysis. Typically, hemolysis was done with chemical or mechanical means.

Some devices lyse the red blood cells using ultrasound. Some point-of-care testing devices use spectrophotometric optical absorption measurement for the determination of the oximetry parameters, also known as CO-oximetry parameters, on a whole blood sample. These devices are fluidic systems that typically position the patient blood sample in a sample chamber for testing the blood sample. For example, one system described in U.S. Pat. No. 9,097,701 ("Apparatus for Hemolyzing a Blood Sample and for Measuring at Least One Parameter Thereof", issued Aug. 4, 2015) uses two piezo elements, with two balanced resonant elements, surrounding a sample chamber symmetrically, to lyse the red blood cells using ultrasonic waves. However, these devices are difficult and expensive to manufacture, including requiring a highly precise symmetry with specially made resonant elements and infrastructure to hold all the elements in alignment.

Once the red blood cells are lysed, the blood sample may then be tested with a spectrophotometer to analyze the intensity of the predetermined wavelengths of light transmitted through a cartridge's sample vessel optical window. A spectrophotometer is an apparatus for measuring the intensity of light in a part of the spectrum of interest, especially as transmitted or emitted by particular substances of interest. The spectrophotometer measures how much a chemical substance absorbs light by measuring the intensity of light as a beam of light passes through the blood sample, or other solution, following the Beer-Lambert absorbance law. Each compound in the sample or solution absorbs or transmits light over a particular range of wavelengths of interest.

In such tests, critical-care hematology parameters may be measured that may include hematocrit, free and total hemoglobin, bilirubin, lipids, and oximetry (i.e., the forms of hemoglobin known as oximetry fractions). Doctors and clinicians rely on these measurements to make decisions during patient treatment. These measurements are often performed in a central hematology laboratory on large, complex-to-maintain analyzers. However, obtaining fast, accurate, and precise results in a point-of-care setting is in many ways preferable because it saves time in critical diagnostic situations and avoids specimen transport problems in critical care units. Some blood gas analyzers offer point-of-care capability, but do not present a single solution that provides desired time-to-result, accuracy, precision, and reliability, while being simpler and easier to manufacture than existing devices, and easy for clinicians to use.

What is needed is a lysis device to provide improved accuracy and precision of measured parameters of a sample within a desired time-to-result at the point of care of a patient, and that is more easily manufactured and with less cost.

SUMMARY

Acoustophoretic lysis devices, methods, and systems are disclosed. The problem of complicated, slow, imprecise, and inaccurate blood sample testing for point-of-care use is solved by a device uniquely configured to lyse red blood cells in a sample vessel by means of acoustophoretic forces in the sample by means of a single acoustic transducer, such as a piezo transducer driven to vibrate at one or more particular excitation frequencies, or a range of excitation frequencies.

Consistent with an aspect of the present disclosure, an exemplary acoustophoresis device may comprise a sample vessel having an outer surface, a microchannel within confines of the outer surface, a first port extending through the outer surface to the microchannel, and a second port extending through the outer surface to the microchannel, such that a blood sample having red blood cells and plasma is insertable through the first port into the microchannel, the sample vessel having conductive traces on the outer surface; and an acoustic transducer bonded to the outer surface of the sample vessel to form a monolithic structure, the piezo transducer contacting at least one of the conductive traces, the piezo transducer configured to generate ultrasonic waves inside a sample in the microchannel, the piezo transducer having a power input electrically connected to the at least one of the conductive traces. The microchannel has a length, a width and a height, and wherein a microchannel aspect ratio of the width to the height may be in a range from approximately 0.04 to approximately 0.175; and wherein the sample vessel has a width and a height, and wherein a sample vessel aspect ratio of the width to the height may be in a range from approximately 0.5 to approximately 3.0. An acoustic transducer, such as a piezo transducer may be bonded to the outer surface of the sample vessel to form a monolithic structure, the piezo transducer configured to generate ultrasonic standing waves inside the blood sample in the microchannel and configured to vibrate the sample vessel such that shear forces are induced within the microchannel, the standing waves and the shear forces causing cavitation in the blood sample thereby rupturing red blood cell walls in the blood sample and releasing hemoglobin into the plasma. The piezo transducer has a length, a width and a height, and wherein the piezo transducer may have a length in a range from between 75% and 125% of the length of the channel. The piezo transducer may have a height of 2 mm.

Consistent with an aspect of the present disclosure, an exemplary acoustophoresis system, comprises a sample vessel having an outer surface, a microchannel within confines of the outer surface, a first port extending through the outer surface to the microchannel, and a second port extending through the outer surface to the microchannel, such that a sample is insertable through the first port into the microchannel, the sample vessel having conductive traces on the outer surface; and an acoustic transducer, such as a piezo transducer, bonded to the outer surface of the sample vessel to form a monolithic structure, the piezo transducer contacting at least one of the conductive traces, the piezo transducer configured to generate ultrasonic waves inside the sample in the microchannel and configured to vibrate the sample vessel such that shear forces are induced within the microchannel; an absorbance spectrophotometer comprising a transmitter and a receiver positioned adjacent to the sample vessel, the transmitter positioned to emit a light beam through the microchannel, and a receiver positioned to receive at least a portion of the light beam after the portion of the light beam has passed through the microchannel; a fluidic distribution system having an outlet connected to the first port, and an inlet connected to the second port; and a controller electrically connected to the piezo transducer and configured to provide electrical signals to the piezo transducer that when received by the piezo transducer cause the piezo transducer to emit ultrasonic waves and cause the piezo transducer to contract and elongate producing magnitude and phase signals in response, which may be measured by a processor, to calibrate and tune the acoustophoresis system for optimum performance and determine structural integrity. In some embodiments, the microchannel may have a length, a width and a height, and wherein a microchannel aspect ratio of the width to the height is in a range from approximately 0.04 to approximately 0.175; and wherein the sample vessel has a width and a height, and wherein a sample vessel aspect ratio of the width to the height is in a range from approximately 0.5 to approximately 3.0. The piezo transducer is configured to generate ultrasonic standing waves inside the blood sample in the microchannel and configured to vibrate the sample vessel such that shear forces are induced within the microchannel, the standing waves and the shear forces causing cavitation in the blood sample thereby rupturing cell walls and releasing hemoglobin into the blood sample.

The channel depth can be in a range from 50 to 150 microns. The channel width can be in a range from 1000 microns to 3500 microns. In one embodiment the width can be in a range from 1000 microns to 2500 microns, and the length can be in a range from 8000 to 20000 microns. In some embodiments the length can be in a range from 11000 to 20000 microns.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
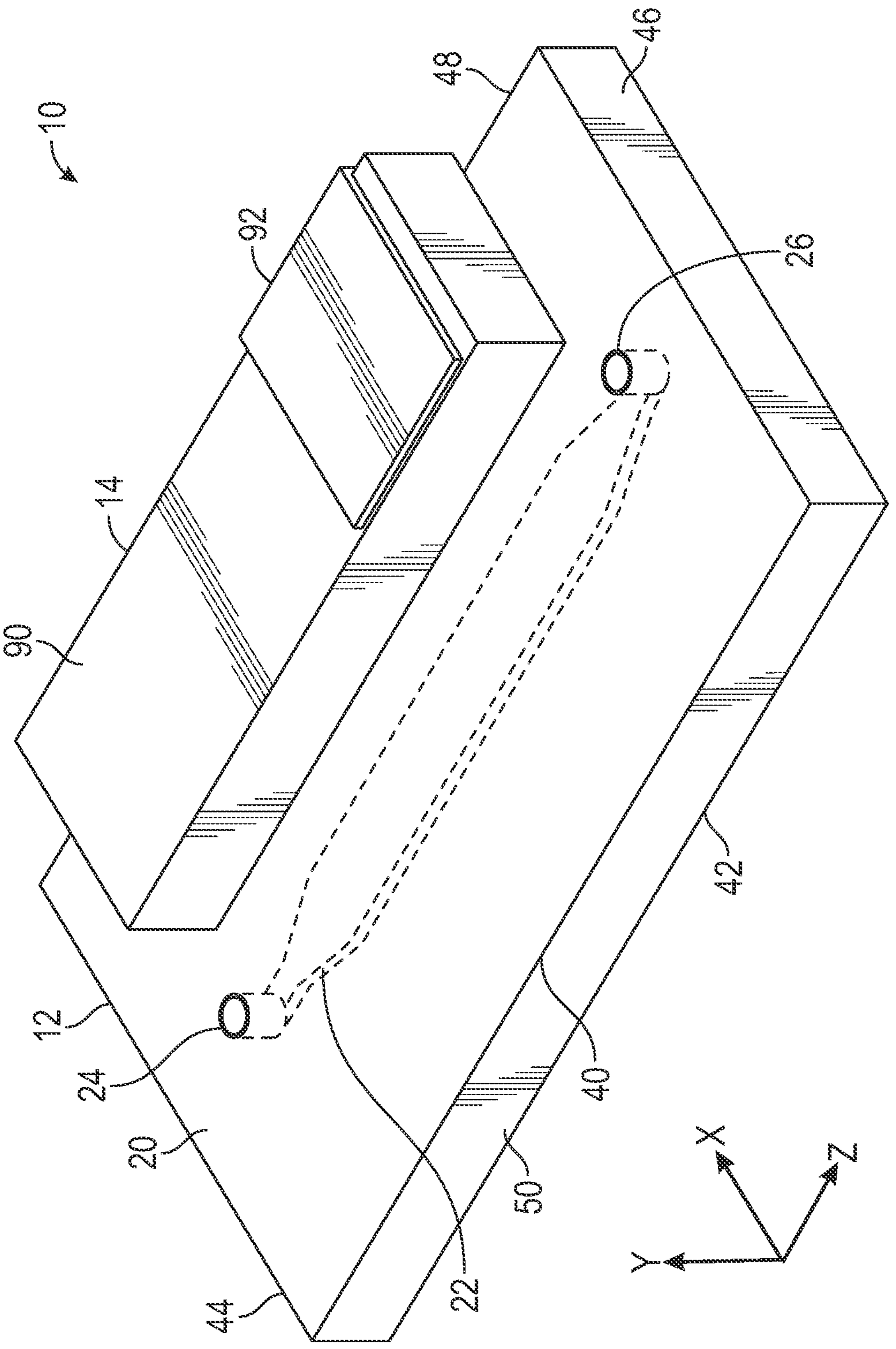
FIG. 1 is a perspective view of an acoustophoretic lysis device in accordance with the present disclosure.
Figure 2:
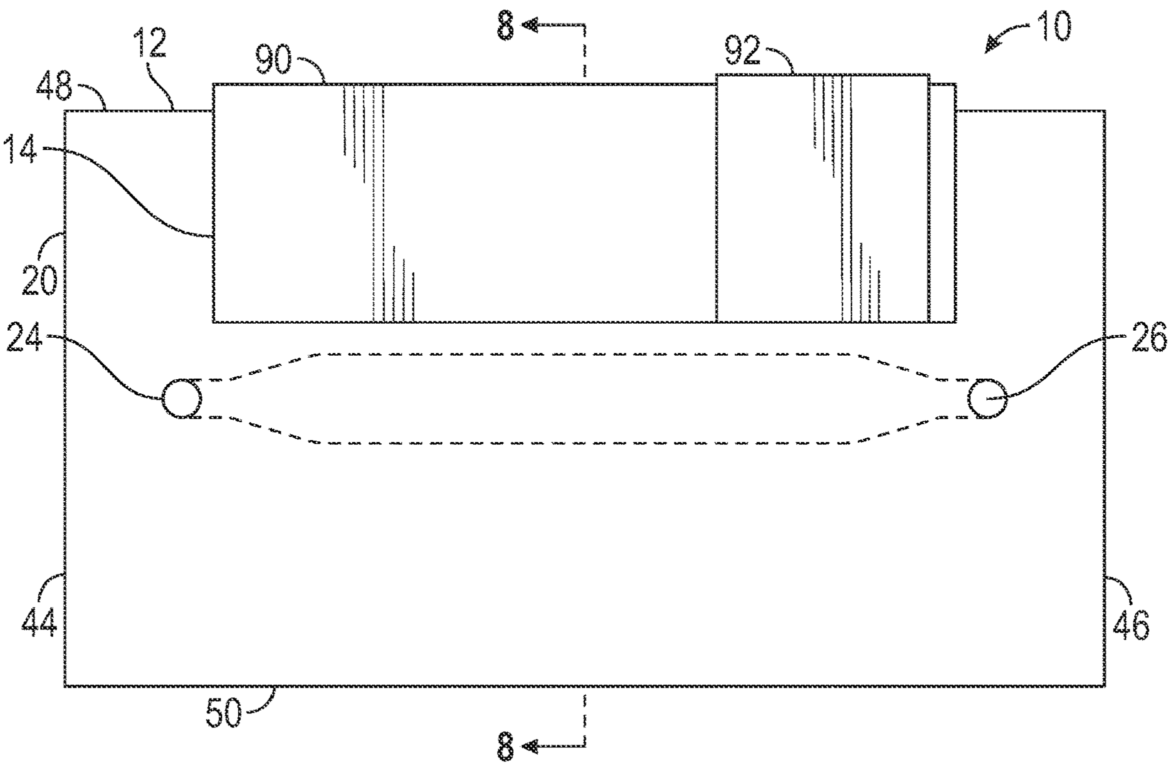
FIG. 2 is a top plan view of an acoustophoretic lysis device in accordance with the present disclosure.
Figure 3:
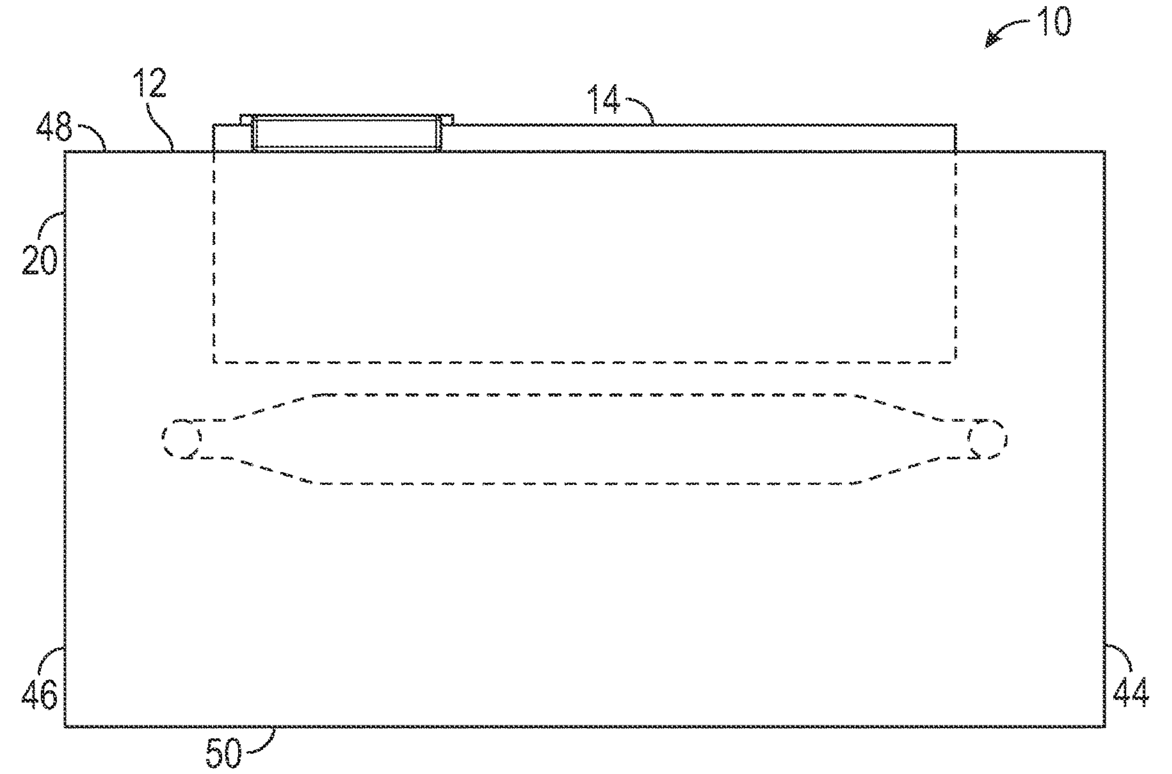
FIG. 3 is bottom plan view of an acoustophoretic lysis device in accordance with the present disclosure.
Figure 4:
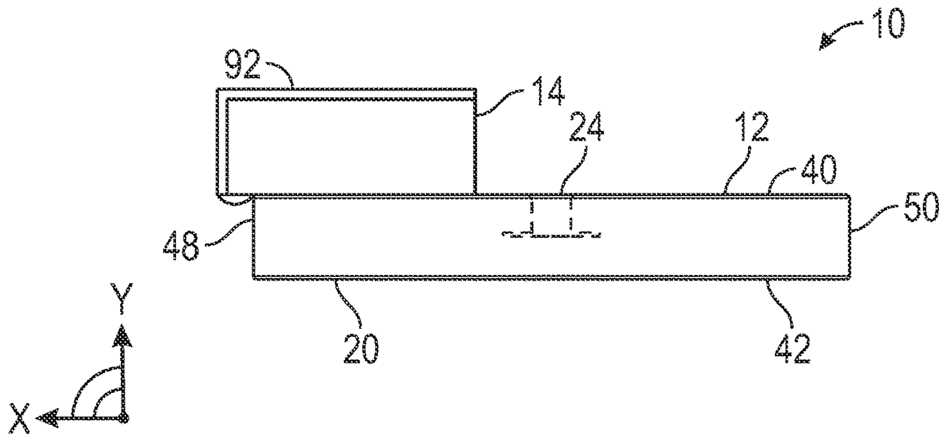
FIG. 4 is a first end elevational view of an acoustophoretic lysis device in accordance with the present disclosure.
Figure 5:
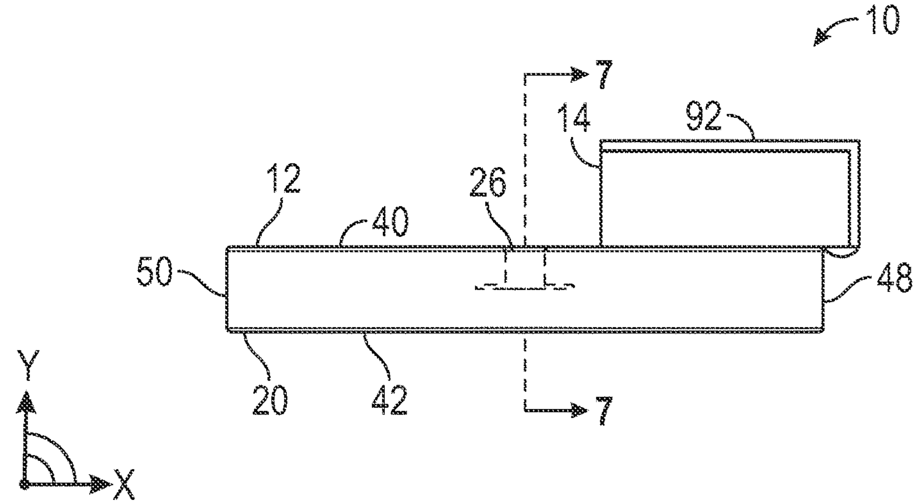
FIG. 5 is a second end elevational view of an acoustophoretic lysis device in accordance with the present disclosure.
Figure 6:
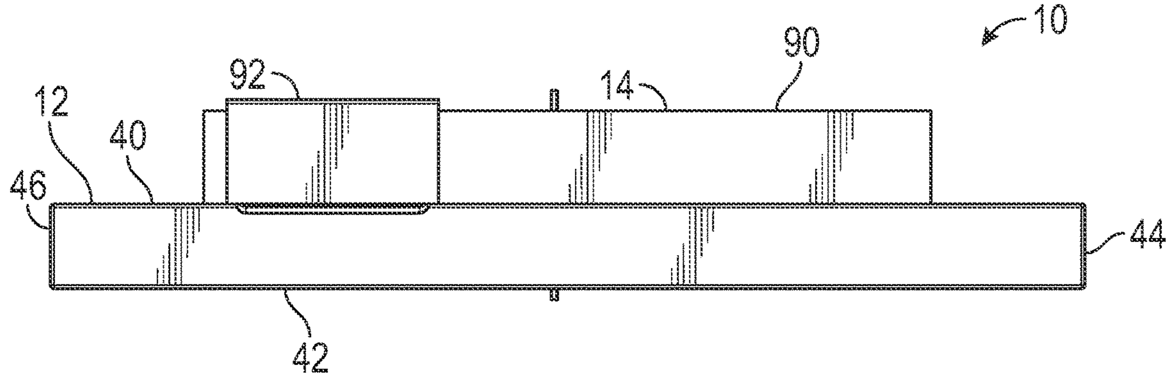
FIG. 6 is a first side elevational view of an acoustophoretic lysis device in accordance with the present disclosure.
Figure 7:
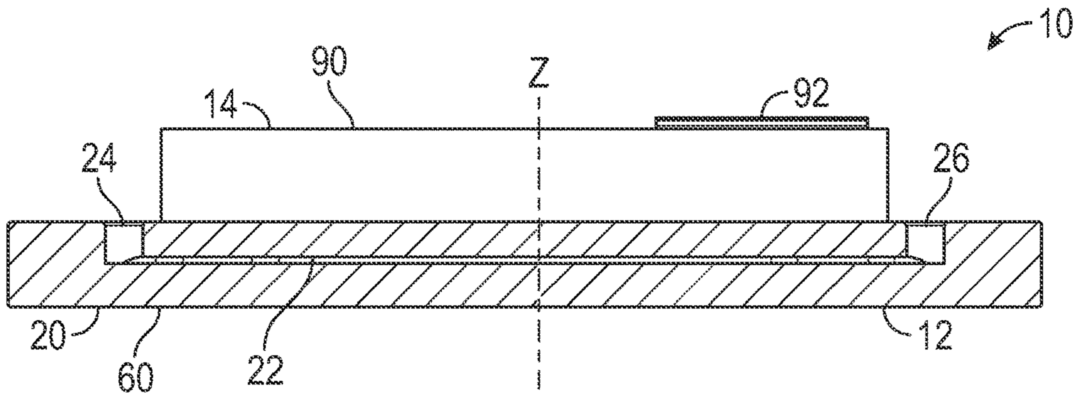
FIG. 7 is a cross-sectional view of an exemplary acoustophoretic lysis device in accordance with the present disclosure.
Figure 8:
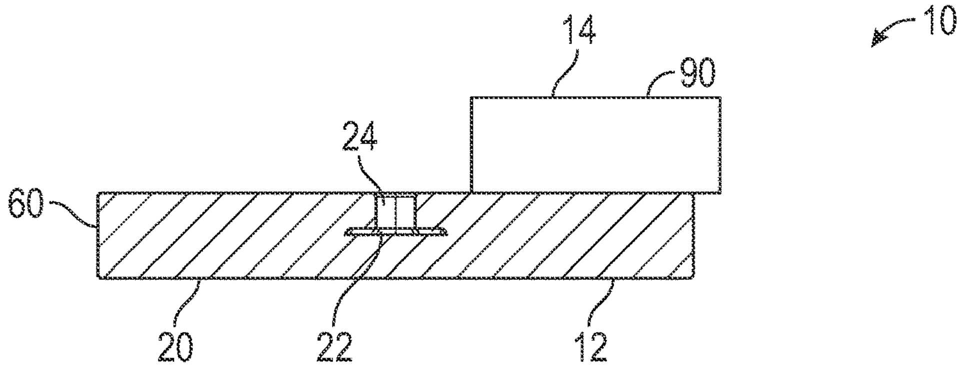
FIG. 8 is a cross-sectional view of an exemplary acoustophoretic lysis device in accordance with the present disclosure.

The following detailed description refers to the accompanying drawings. The same reference numbers in different drawings may identify the same or similar elements.

The mechanisms proposed in this disclosure circumvent the problems described above. The present disclosure describes lysis devices, analyzers, and lysis methods, including a lysis device configured to lyse red blood cells in a sample vessel by means of ultrasonic waves, shear forces, pressure, and/or fluid movement, generated in the sample vessel by an acoustic transducer, which will be described hereinafter as a piezo transducer by way of example. The piezo transducer is connected to the sample vessel and driven at one or more particular excitation frequencies, or a range of excitation frequencies. In one nonlimiting embodiment, the piezo transducer is a single piezo transducer. The present disclosure further describes an analyzer configured to receive and interact with the lysis device for testing a sample in the sample vessel, as well as a method of use.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, typical previous devices for blood sample testing for point-of-care use are complicated, slow, imprecise, and inaccurate. The present disclosure addresses these deficiencies with devices, systems, and methodology for lysing red blood cells in a sample vessel by means of ultrasonic waves, shear forces, pressure, and/or fluid movement, generated in the sample vessel by a single piezo transducer connected to the sample vessel and driven at one or more particular excitation frequencies, or a range of excitation frequencies.

Referring now to the drawings, and in particular to FIGS. 1-8, an acoustophoretic lysis device 10 is shown. In general, the lysis device 10 comprises a sample vessel 12 and an piezo transducer 14 bonded to the sample vessel 12. In one embodiment, the lysis device 10 is a monolithic structure, such as that formed by the sample vessel 12 and the piezo transducer 14 bonded together using a suitable bonding material, such as epoxy.

The sample vessel 12 has an outer surface 20, a microchannel 22 within the confines of the outer surface 20, a first port 24 extending through the outer surface 20 to the microchannel 22 and in fluid communication with the microchannel 22, and a second port 26 extending through the outer surface 20 to the microchannel 22 and in fluid communication with the microchannel 22. In one embodiment, the outer surface 20 may have a mounting area for the piezo transducer 14.

In one embodiment, the sample vessel 12 has a top 40, a bottom 42, a first end 44, a second end 46, a first side 48, and a second side 50, wherein the first side 48 and the second side 50 extend between the first end 44 and the second end

46 and between the top 40 and the bottom 42. In one embodiment, the top 40 and the bottom 42 are planar. In one embodiment, the first side 48 and the second side 50 are planar. In one embodiment, the first end 44 and the second end 46 are planar. In one embodiment, the top 40, the bottom 42, the first end 44, the second end 46, the first side 48, and the second side 50 cooperate to form a three-dimensional rectangular cuboid.

The sample vessel 12 may be partially, substantially, or completely transparent. In one embodiment, the sample vessel 12 is transparent at least above and below the microchannel 22, such that a light beam may pass through the sample vessel 12 through the microchannel 22, interact with any substance within the microchannel 22, and pass out of the sample vessel 12.

The sample vessel 12 may be constructed of glass. In one embodiment, the sample vessel 12 may be constructed of a material (glass or non-glass) having a Young's modulus within a range from about 50 Gpa to about 90 Gpa. The material property known as Young's modulus, or the modulus of elasticity, is a measure of the ability of the material to withstand changes in length when under lengthwise tension or compression. Young's modulus is equal to the longitudinal stress divided by the strain. In one embodiment, the sample vessel 12 may be constructed of plastic, such as cyclic olefin copolymer, with a rigidity and/or Young's modulus similar to that of glass. In one embodiment, the sample vessel 12 may be constructed from alkali borosilicate glass. One example of alkali borosilicate glass is made by Schott Advanced Optics, located at 400 York Avenue, Duryea, PA 18642, and marketed under the name "D 263 T ECO Thin Glass."

The sample vessel 12 has a length from the first end 44 to the second end 46, a width from the first side 48 to the second side 50, a thickness between the top 40 and the bottom 42, and an aspect ratio defining the proportional relationship between the length and the width. The sample vessel 12 has a longitudinal axis along the length and a latitudinal axis along the width.

In one embodiment, the aspect ratio of the sample vessel 12 is in a range from approximately 0.5 to approximately 3.0. In one embodiment, the aspect ratio of the sample vessel 12 is in a range from approximately 1.4 to approximately 1.9. In one embodiment, the length may be approximately twenty-two millimeters and the width may be approximately twelve millimeters. In one embodiment, the length may be approximately seventeen millimeters and the width may be approximately twelve millimeters. In one embodiment, the length may be approximately seventeen millimeters and the width may be approximately six millimeters. In one embodiment, the length may be approximately twelve millimeters and the width may be approximately six millimeters.

The microchannel 22 may be configured to receive a fluidic sample 52 (including, but not limited to, a blood sample, a "blank" sample, and/or a washing solution sample) through the first port 24 and/or the second port 26. The microchannel 22 has a length, a width, and a height. Typically, the length of the microchannel 22 is oriented along the longitudinal axis of the sample vessel 12 and the width of the microchannel 22 is oriented along the latitudinal axis of the sample vessel 12. However, it will be understood that the microchannel 22 may be oriented at an angle from or offset from the longitudinal axis and/or the latitudinal axis of the sample vessel 12.

The microchannel 22 has an aspect ratio defining the proportional relationship between the width and the height of the microchannel 22. In one embodiment, the width to height aspect ratio of the microchannel 22 is in a range from approximately 0.04 to approximately 0.175. In one embodiment, the width to height aspect ratio of the microchannel 22 is in a range from approximately 0.04 to approximately 0.125. In one embodiment, the width to height aspect ratio of the microchannel 22 is approximately 0.05.

In one embodiment, the width of the microchannel 22 is about two millimeters. In one embodiment, the width of the microchannel 22 is greater than an illumination width of a light yield area of the absorbance spectrophotometer 102. An illumination width may be defined as the width of a cross-section of the light yield along an optical pathway from the absorbance spectrophotometer 102 where the optical pathway intersects the microchannel 22. For example, when the illumination diameter is between 1 millimeter and 1.5 millimeters, then the width of the microchannel 22 may be at least approximately 1.6 millimeters. The width of the microchannel 22 may be determined to allow for adequate mechanical alignment between the microchannel 22 and optical pathway. For example, for an illumination width between one millimeter and 1.5 millimeters, the width of the microchannel 22 may be approximately two millimeters.

In one embodiment, the length of the microchannel 22 may be between approximately ten millimeters and approximately twelve millimeters. In one embodiment, the length of the microchannel 22 may be at least approximately four millimeters. In one embodiment, the length of the microchannel 22 may be between approximately four millimeters and approximately twenty millimeters.

In one embodiment, the length of the microchannel 22 may be based at least in part on a predetermined desired number of nodes to be created in the microchannel 22. For example, for a microchannel 22 having a width of approximately two millimeters and where a whole blood wave propagation speed is approximately 1500 m/s, a calculated single node is at 350 kHz. The nodes may be distributed in the microchannel 22 evenly spaced along the length of the microchannel 22 (for example, 2×2 mm=4 mm), where high pressure creates a uniform distribution of lysed blood. For example, if the predetermined desired number of nodes is five nodes on each side wall of the microchannel 22 (see FIG. 13), then the length of the microchannel 22 may be set at approximately seventeen millimeters so that the first port 24 and the second port 26 are not placed in one of the nodes.

The height of the microchannel 22 can vary, as discussed below. The height of the microchannel 22 may be based on the amount of absorption in lysed blood of the light yield from the absorbance spectrophotometer 102 and the desired precision of the absorption. For example, the desired absorption may be at approximately 1 Optical Density (OD).

In one embodiment, the height of the microchannel 22 is about 100 micrometers. In one embodiment, the height of the microchannel 22 is about 150 micrometers. In one embodiment, the height of the microchannel 22 is about 250 micrometers. In one embodiment, the height of the microchannel 22 is about 300 micrometers. In one embodiment, the height of the microchannel 22 is between approximately 80 micrometers and approximately 300 micrometers. In one embodiment, the height of the microchannel 22 is between approximately 80 micrometers and approximately 150 micrometers.

The first port 24 and the second port 26 are fluidly connected to the microchannel 22 and extend from the microchannel 22 through the outer surface 20 of the sample vessel 12. In one embodiment, the first port 24 is fluidly connected to the microchannel 22 and may extend from the microchannel 22 to the top 40, the bottom 42, the first end 44, the second end 46, the first side 48, and/or the second side 50 of the sample vessel 12. In one embodiment, the second port 26 is fluidly connected to the microchannel 22 and may extend from the microchannel 22 to the top 40, the bottom 42, the first end 44, the second end 46, the first side 48, and/or the second side 50 of the sample vessel 12. The first port 24 and the second port 26 may extend to the same or to different ones of the top 40, the bottom 42, the first end 44, the second end 46, the first side 48, and/or the second side 50.

In one embodiment, the first port 24 and the second port 26 each have a diameter of between approximately 0.5 millimeter (500 micrometers) and approximately 1.5 millimeters (1500 micrometers). In one embodiment, the first port 24 and the second port 26 each have a diameter of approximately 0.8 millimeter (800 micrometers).

The sample vessel 12 may be a monolithic fabrication, either in that the sample vessel 12 is formed from a single piece of material or in that the sample vessel 12 is formed from a plurality of pieces that are interconnected to form a unified whole or integral structure.

As shown in FIGS. 4-8, in one embodiment, the sample vessel 12 may comprise a single substrate 60 bound by the outer surface 20 and having the microchannel 22 within the single substrate 60 and the first port 24 and the second port 26 fluidly connected to the microchannel 22 and extending to the outer surface 20. For example, the sample vessel 12 may be a 3D printed substrate, such as 3D printed glass substrate. The 3D printed substrate may be printed to include the microchannel 22, the first port 24, and the second port 26.

Figure 9:
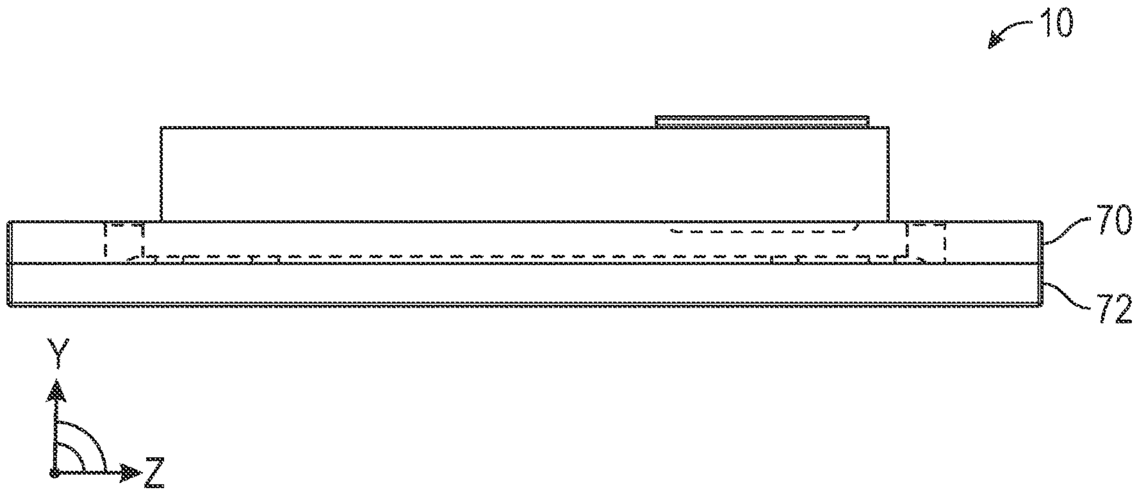
FIG. 9 is a first side elevational view of another exemplary acoustophoretic lysis device in accordance with the present disclosure.

As illustrated in FIG. 9, in one embodiment, the sample vessel 12 may comprise a first substrate 70 and a second substrate 72. The second substrate 72 may be layered with the first substrate 70 so as to form a monolithic structure. In one embodiment, the first substrate 70 and the second substrate 72 may be annealed to one another. In one embodiment, the first substrate 70 and the second substrate 72 may be thermal-plasma bonded to one another. In one embodiment, the first substrate 70 and the second substrate 72 have the same length to width aspect ratio as the sample vessel 12.

The microchannel 22 may be positioned in the first substrate 70, the second substrate 72, and/or be formed partially in the first substrate 70 and partially in the second substrate 72. In one embodiment, the microchannel 22, the first port 24, and the second port 26 are positioned in the first substrate 70. In one embodiment, the microchannel 22 is etched into the first substrate 70 and/or the second substrate 72. In one embodiment, the microchannel 22 is positioned in the first substrate 70 and one or both of the first port 24 and the second port 26 is positioned in the second substrate 72. One or both of the first port 24 and the second port 26 may be positioned in (and/or extend through) the first substrate 70 and/or the second substrate 72.

Figure 10:
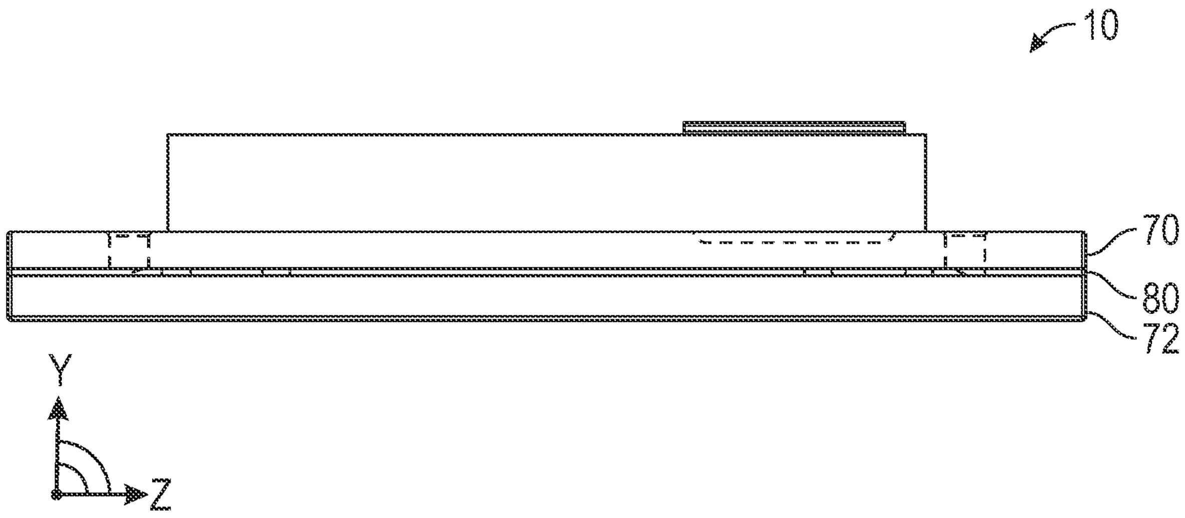
FIG. 10 is a first side elevational view of yet another exemplary acoustophoretic lysis device in accordance with the present disclosure.
Figure 11A:
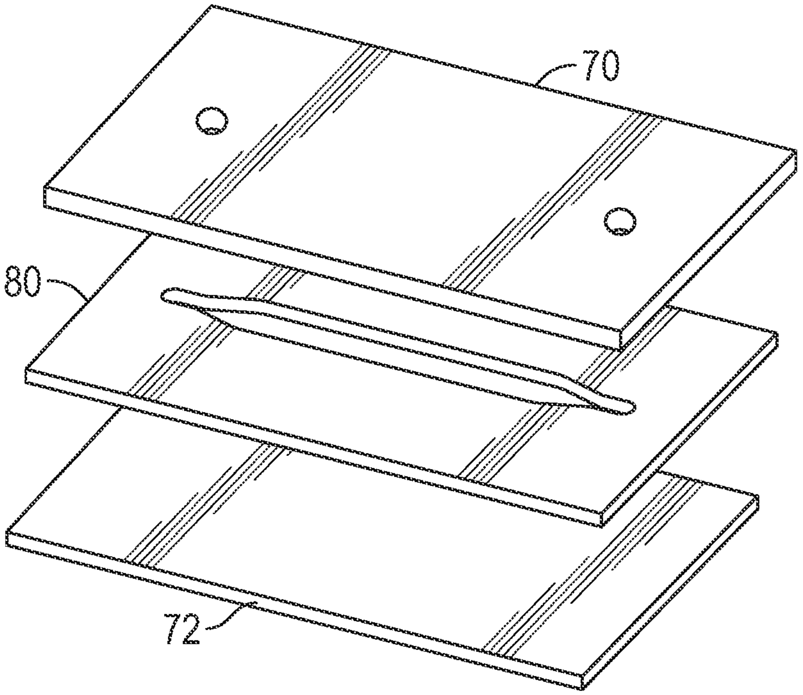
FIG. 11A is a perspective view of components of an exemplary sample vessel in accordance with the present disclosure.
Figure 11B:
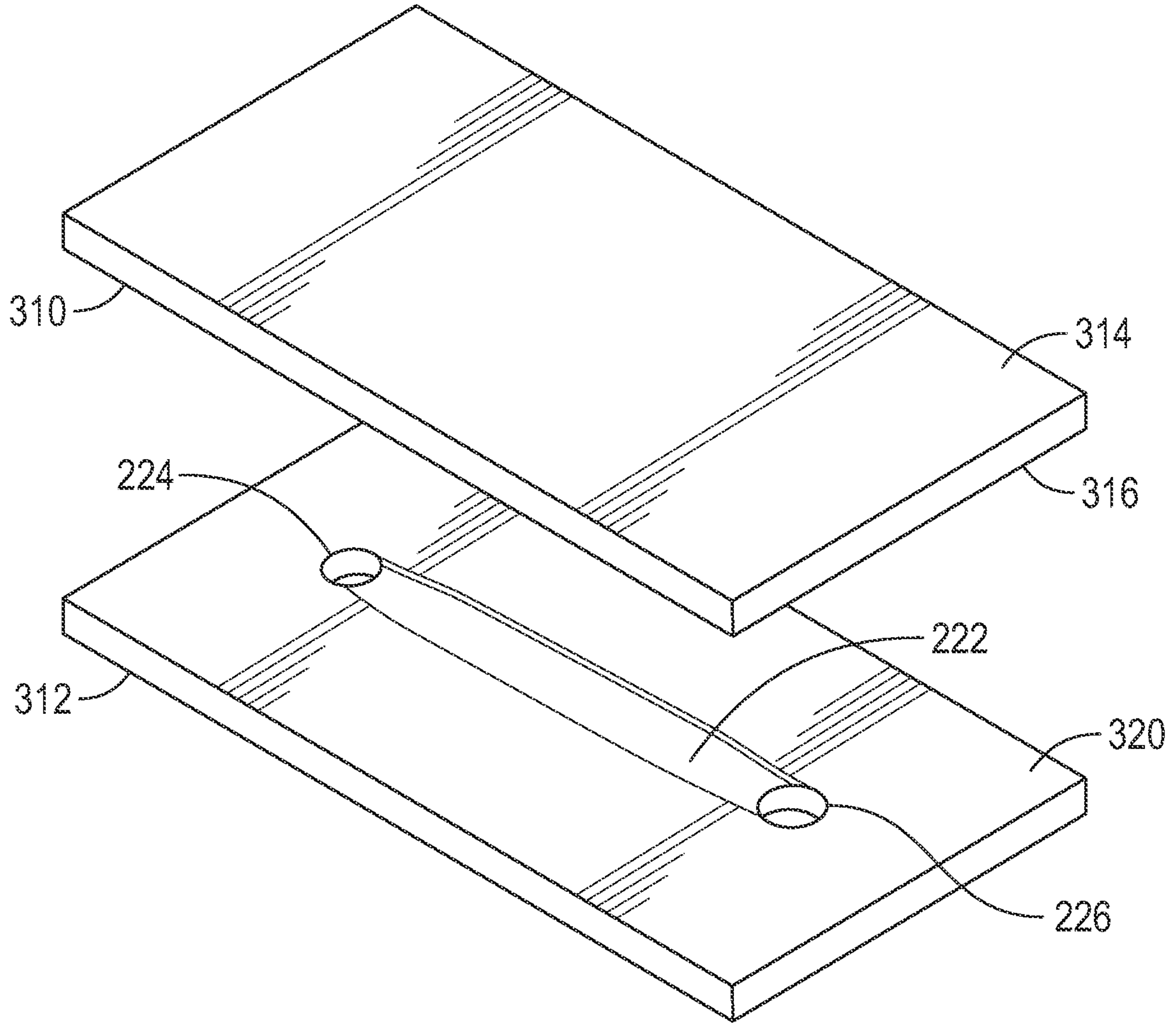
FIG. 11B is a perspective view of components of another exemplary sample vessel in accordance with the present disclosure.
Figure 24:
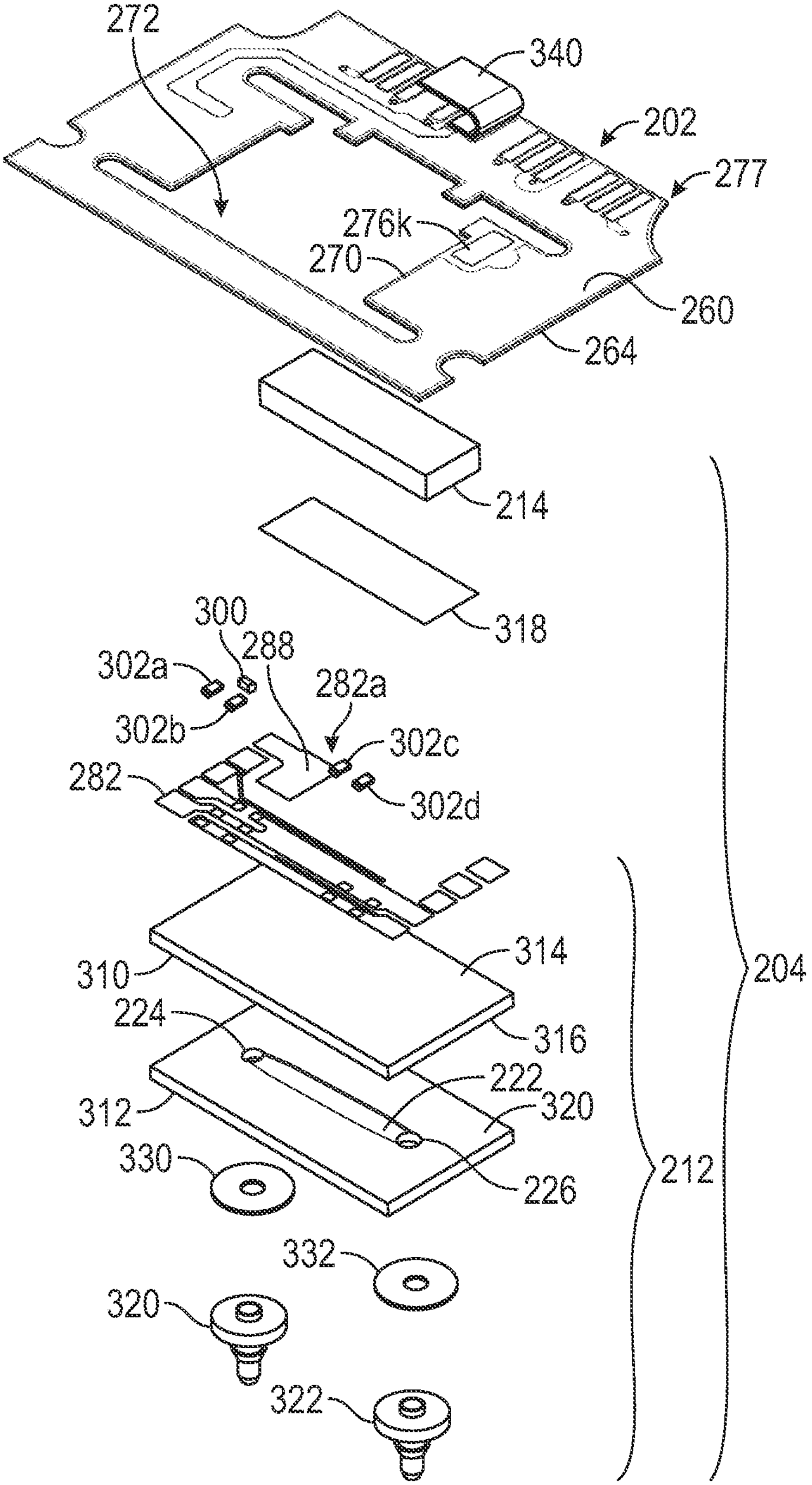
FIG. 24 is an exploded view of the assembly depicted in FIG. 21.

As illustrated in FIGS. 10 and 11A, in one embodiment, the sample vessel 12 may comprise the first substrate 70, the second substrate 72, and a third substrate 80 between the first substrate 70 and the second substrate 72. The first substrate 70, the second substrate 72, and the third substrate 80 may be layered so as to form a monolithic structure. In one embodiment, the first substrate 70, the second substrate 72, and the third substrate 80 may be thermal-plasma bonded to one another. In one embodiment, the first substrate 70, the second substrate 72, and the third substrate 80 may be annealed to one another. One or both of the first port 24 and the second port 26 may be positioned in the first substrate 70. The first substrate 70 may have a thickness of 700 micrometers. The microchannel 22 may be positioned in the second substrate 72. The second substrate 72 may have a thickness of 700 micrometers and be devoid of the first port 24, the second port 26 and the microchannel 22. In one embodiment, the microchannel 22 is a slot positioned through the third substrate 80. In one embodiment, the third substrate 80 may have the same thickness as the height of the microchannel 22. In one embodiment, the third substrate 80 may be 100 micrometers thick. In other embodiments, as shown in FIG. 11B (and FIG. 24), the sample vessel 212 has only two glass substrates 310, 312 bonded to each other, instead of three substrates 70, 72, 80 shown in FIG. 11A. The use of two substrates 310, 312 bonded to each other, instead of three substrates 70, 72, 80 improves the manufacturability of the sample vessel 212 without changing the performance of the sample vessel 212 to lyse red blood cells and release hemoglobin from within the cell into the plasma as compared to the performance of the sample vessel 12. As shown in FIG. 24, the first glass substrate 310 includes conductive traces 282 formed thereon, while the second glass substrate 312 includes a microchannel 222, and first and second ports 224, 226. As shown in FIG. 11B, the first glass substrate 310 may be layered on the second glass substrate 312 so as to form a monolithic structure. In some embodiments, the conductive traces 282 (arranged on the first glass substrate 310) are formed of a conductive metallic material with sufficient thickness to be optically opaque to light in the near infrared, far infrared, visible and ultraviolet wavelength ranges.

Returning to FIG. 1, the piezo transducer 14 is mounted to the sample vessel 12 (such as to the mounting area of the outer surface 20) to form the monolithic structure of the lysis device 10. The piezo transducer 14 may have a mounting area that mounts to the mounting area of the outer surface 20. In one embodiment, the piezo transducer 14 is mounted at least partially to the top 40 of the sample vessel 12; however, it will be understood that the piezo transducer 14 may be mounted to the top 40, the bottom 42, the first end 44, the second end 46, the first side 48, and/or the second side 50. The piezo transducer 14 is positioned in relation to the microchannel 22 such that it does not block light from moving through the microchannel 22 from the top or the bottom of the sample vessel 12. The piezo transducer 14 may be offset from the microchannel 22 such that the piezo transducer 14 allows light to enter the microchannel 22 from outside of the sample vessel 12. In one embodiment, the piezo transducer 14 has a length and has a longitudinal axis along the length that is orientated substantially parallel to the longitudinal axis of the sample vessel 12. In one embodiment, the piezo transducer 14 has a width that is smaller than the length of the piezo transducer 14.

The piezo transducer 14 may be positioned on the opposite side from one or both of the first port 24 and the second port 26 or on the same side as one or more of the first port 24 and the second port 26 on the sample vessel 12

The piezo transducer 14 may be bonded to the sample vessel 12. The bond may be thin relative to a thickness of the piezo transducer 14 and the sample vessel 12. The piezo transducer 14 may be bonded to the sample vessel 12 with an adhesive. The adhesive may be configured to allow wave propagation with low losses of waves. In one embodiment, a liquid adhesive may be applied to the piezo transducer 14 and then the piezo transducer 14 may be attached via the liquid adhesive to the sample vessel 12. For example, a liquid adhesive having temperature stability up to 350° C., excellent adhesive force on glass, and high hardness (rigidity) may be applied. In one example, the liquid adhesive may be an epoxy glue, such as EPO-TEK 353ND (made by Epoxy Technology, Inc., located at 14 Fortune Drive, Billerica, MA), which allows for ultrasound propagation and which has a shore D hardness of about 85. In one example, approximately 5 μl of liquid adhesive may be applied. The piezo transducer 14 may be clamped to the sample vessel 12 and the adhesive cured at approximately 150° C. In one implementation, after curing, the thickness of the adhesive may be in a range of approximately ten μm to 100 μm and more preferably in a range of ten μm to 20 μm. In other embodiments, the adhesive can be a prefabricated adhesive layer film, or an ultraviolet light curing epoxy.

The piezo transducer 14 may be configured to convert a voltage into another form of energy, such as sound waves having one or more frequencies and/or a range of frequencies into coupled solids and liquids with different frequencies. The piezo transducer 14 may be configured to oscillate when alternating current is applied to the piezo transducer 14, thereby creating the sound waves that are introduced into the sample vessel 12, which may create one or more nodes within the blood sample 52 in the sample vessel 12. As shown in FIG. 1, the piezo transducer 14 may comprise a first electrode 90 and a second electrode 92 configured to connect with an alternating current source. In one embodiment, the piezo transducer 14 may be a piezoelectric ultrasonic piezo transducer.

Figure 12:
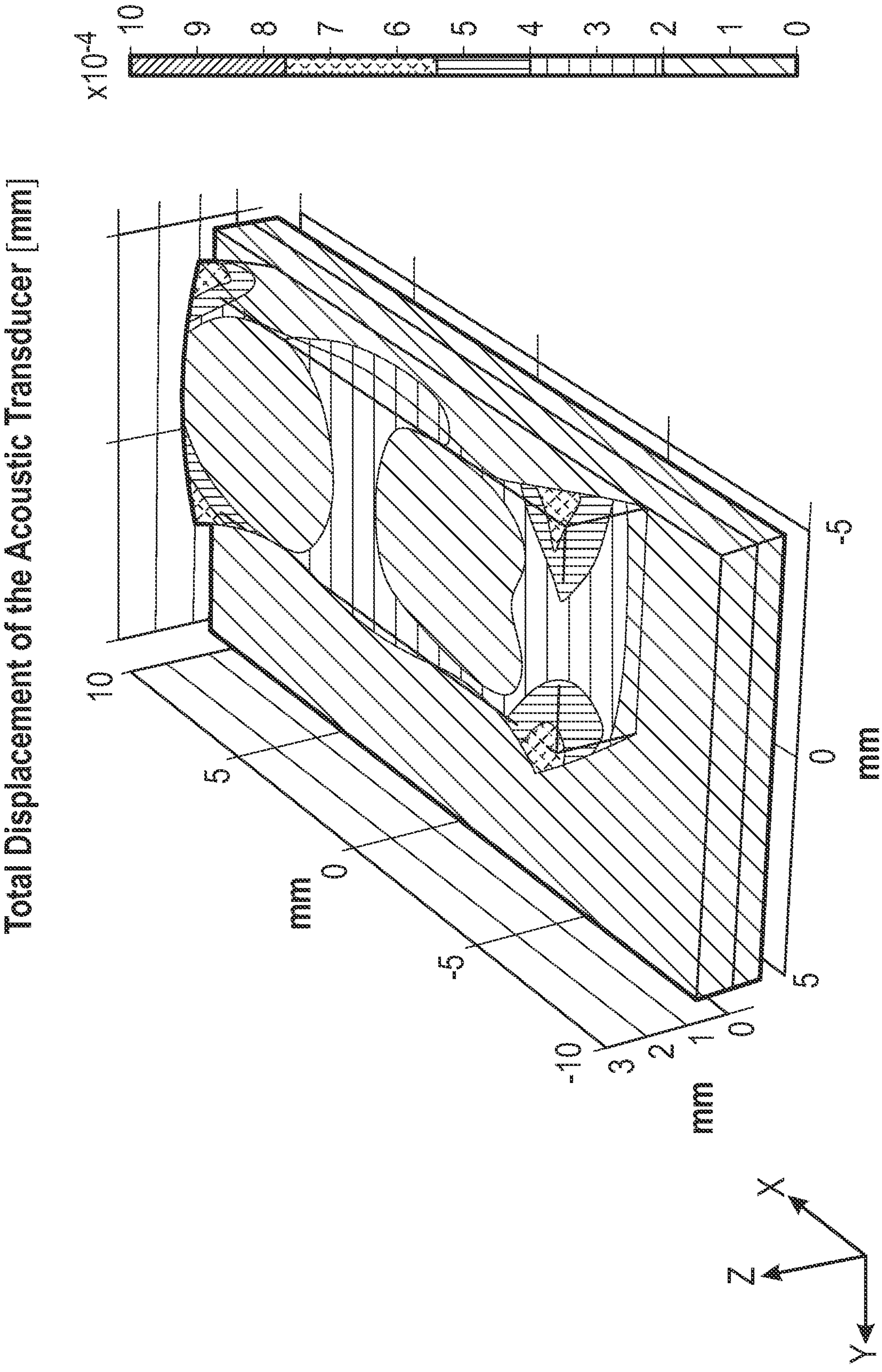
FIG. 12 is a graphical representation of total displacement of an exemplary lysis device in accordance with the present disclosure.

The piezo transducer 14 may be configured to generate ultrasonic activity, producing sound waves with frequencies, by expanding and contracting when exposed to an alternating electric field, e.g., when electrical frequency and voltage is applied. FIG. 12 shows a graphical representation of one example of the total displacement of the piezo transducer 14 in one exemplary operation of the piezo transducer 14.

In one embodiment, the piezo transducer 14 may be configured to produce ultrasonic sound waves having a resonant frequency that causes resonances in a blood sample 52 in the microchannel 22 of the sample vessel 12 such that walls of red blood cells in the blood sample 52 are ruptured. In one embodiment, the piezo transducer 14 may be configured to produce ultrasonic sound waves (which may also be referred to herein as ultrasonic waves) having a resonant frequency that causes cavitation in the blood sample 52, generating bubbles that collapse in regions with higher pressure and create shock waves which then lead to rupturing the walls of the red blood cells releasing hemoglobin into the plasma of the blood sample. In one embodiment, the piezo transducer 14 has a first resonant frequency and the monolithic structure of the lysis device 10 has a second resonant frequency spaced spectrally from the first resonant frequency, the second resonant frequency being a frequency of sound waves that is generated by the piezo transducer 14 and introduced into the sample vessel 12 thereby causing cavitation in the blood sample 52, thereby rupturing the walls of the red blood cells.

Figure 13:
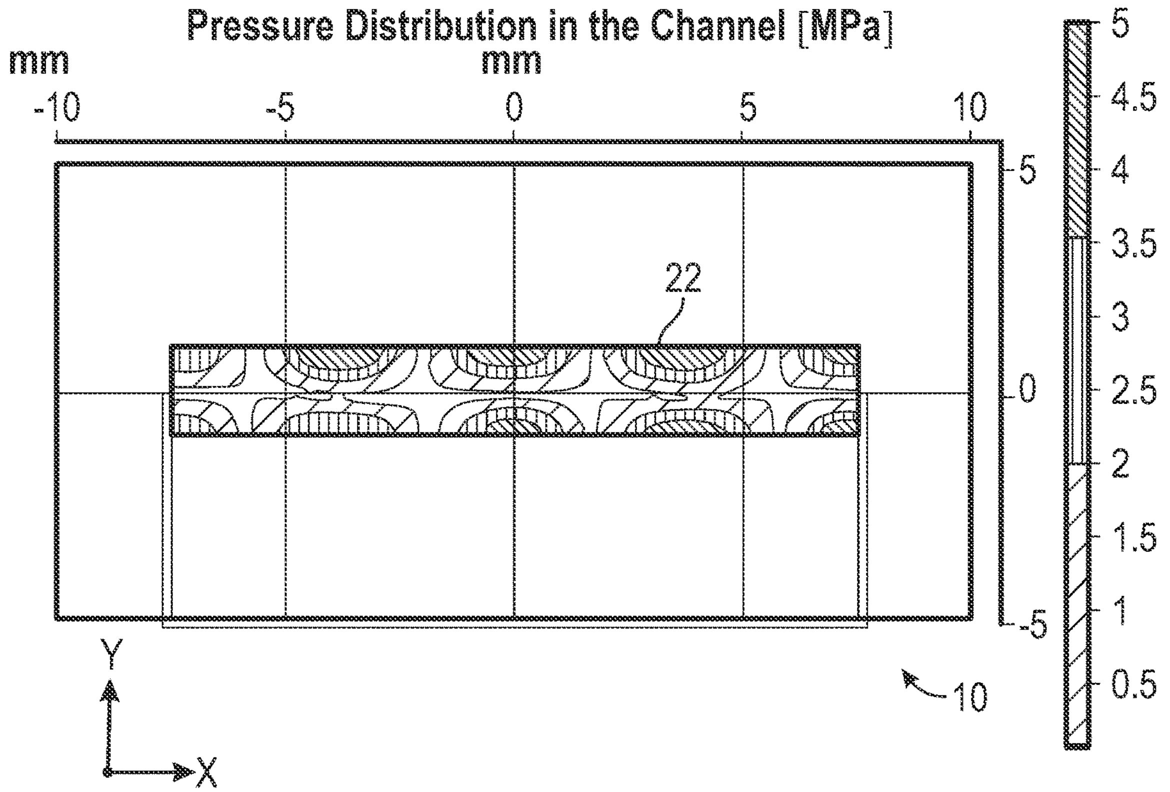
FIG. 13 is a plan view of pressure distribution in a microchannel of an exemplary sample vessel in accordance with the present disclosure.
Figure 14:
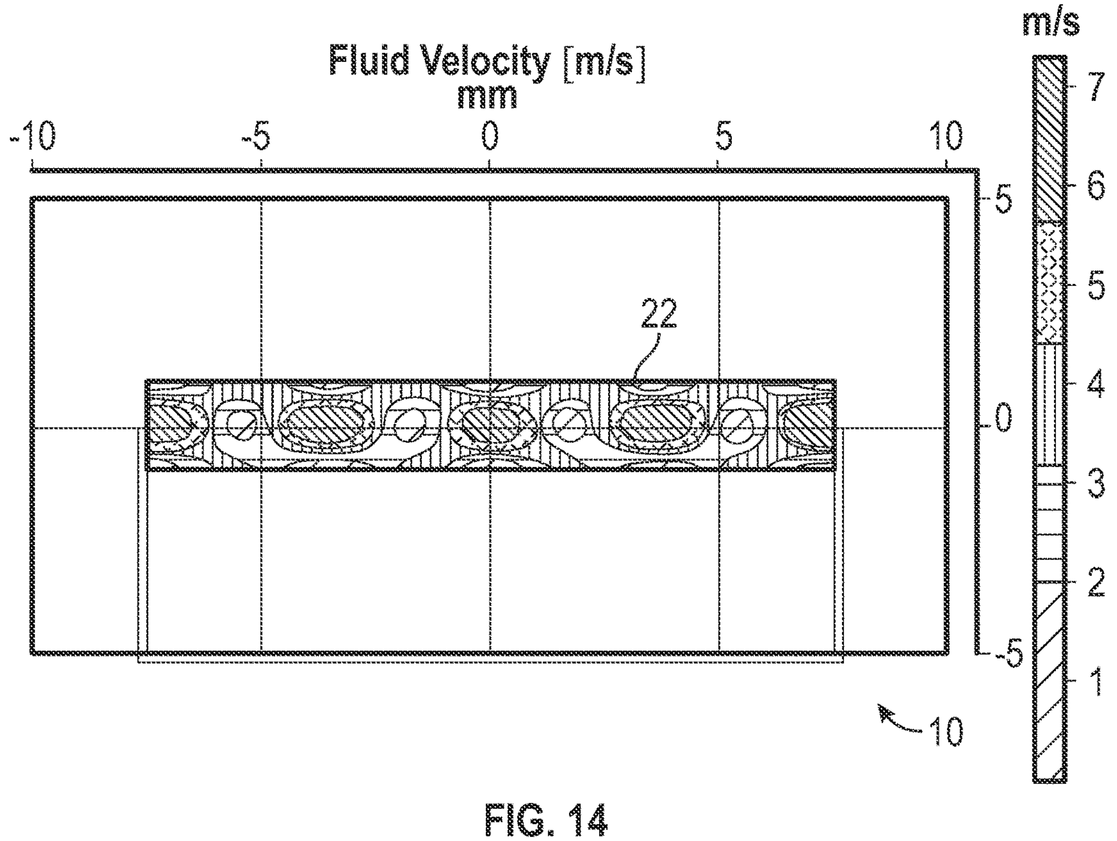
FIG. 14 is a plan view of fluid velocity in a microchannel of an exemplary sample vessel in accordance with the present disclosure.
Figure 15:
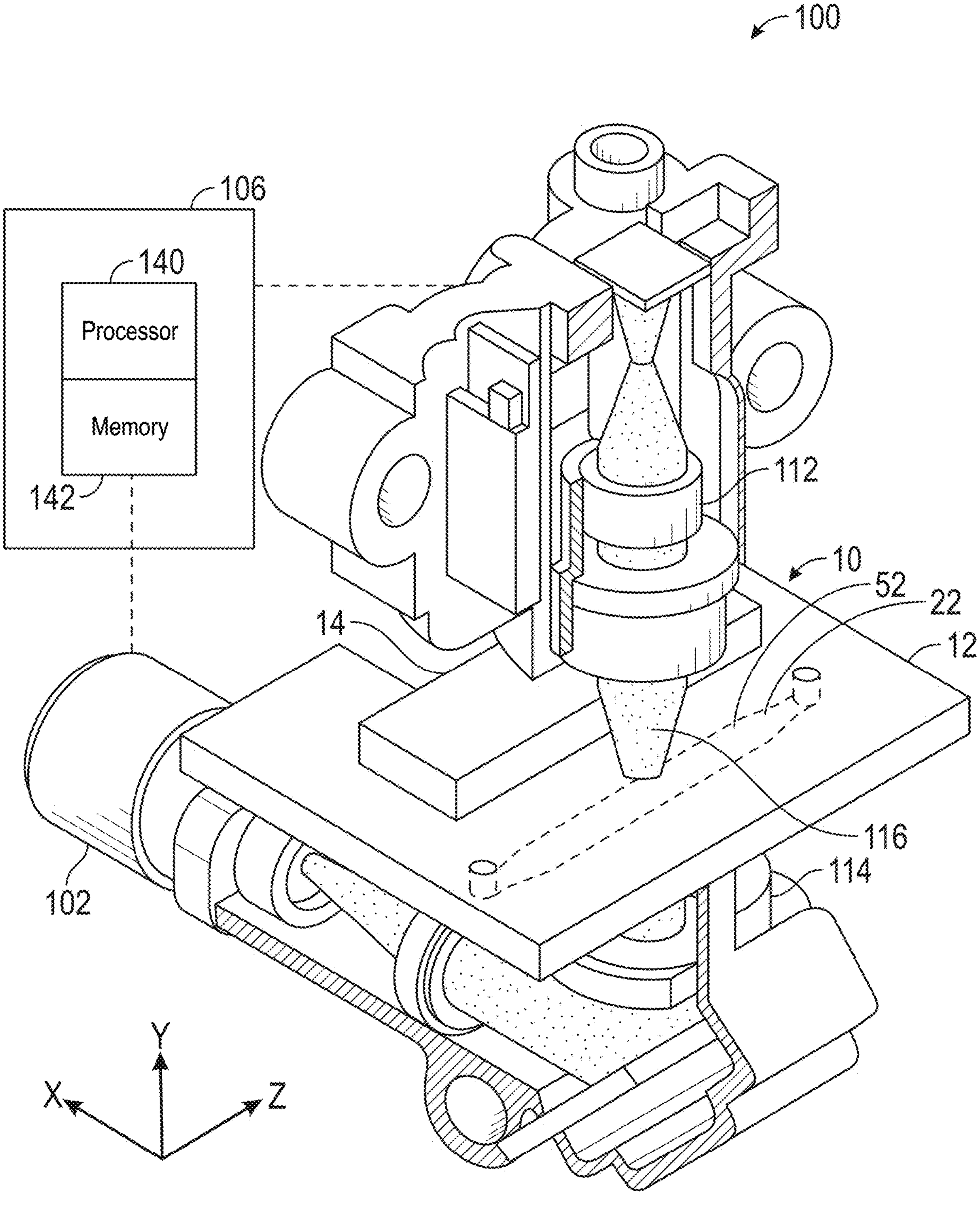
FIG. 15 is a perspective view of an exemplary analyzer in accordance with the present disclosure.

In one embodiment, the second resonant frequency may cause one or more standing waves, which may form in regions (referred to as nodes) having approximately zero force and approximately no particle movement and the highest hydraulic pressure in the microchannel 22, inside the microchannel 22 of the sample vessel 12 such that the walls of red blood cells in the blood sample 52 are ruptured, as illustrated in FIGS. 13 and 14. A standing wave, also known as a stationary wave, is a wave that oscillates in time, but that has a peak amplitude profile that does not move in space.

In one example, at the second resonance of the acoustophoretic lysis device 10 (that is, the sample vessel 12 bonded to the piezo transducer 14), for example, when the sample vessel 12 is made of glass, the microchannel 22 has a width of approximately two millimeters with an aspect ratio of 0.05 to 0.125, and the sample vessel 12 has a width of approximately twelve millimeters with an aspect ratio of 1.4 to 1.9, the piezo transducer 14 may be configured to produce ultrasonic sound waves in the range of 330 kHz to 350 kHz with peak pressure within the microchannel 22 of five MPa (see FIG. 13), and peak velocity up to eight m/s (see FIG. 14). One exemplary case of the pressure distribution (FIG. 13) and the fluid velocity (FIG. 14) of the blood sample 52 in the microchannel 22 when the piezo transducer 14 is activated is illustrated in FIGS. 13 and 14.

However, ultrasonic sound waves inside the microchannel 22 and the ultrasonic piezo transducer 14 may produce undesired heat, including undesired heat in the blood sample 52 in the microchannel 22. To avoid any overheating of the blood sample 52, the piezo transducer 14 may be operated to produce a resonant frequency for a predetermined period of time. For example, the piezo transducer 14 may be operated to generate sound waves having the second resonant frequency for between approximately one second and approximately two seconds. In one embodiment, the piezo transducer 14 may be operated to generate sound waves having the second resonant frequency for less than approximately one and a half seconds. In one example, the lysis device 10 may be configured to operate the piezo transducer 14 for equal to or less than 1.5 seconds to result in 99.99% red blood cell lysis. In one example, the lysis device 10 may be configured to operate the piezo transducer 14 for approximately ten seconds or less.

In one embodiment, the ultrasonic sound waves inside the microchannel 22 disrupt the blood cells and cell walls into fine particles which produce less light scattering during optical measurement of the blood sample 52 than larger particles.

In one embodiment, the piezo transducer 14 may be configured to produce ultrasonic sound waves in a range of frequencies and the second resonant frequency may be within the range of frequencies.

In one embodiment, the piezo transducer 14 may be configured to produce ultrasonic sound waves in a range of frequencies that is greater than approximately 300 kHz.

The resonant frequency, and/or the frequency range, may be determined based on one or more factors including the size, shape, and material of the sample vessel 12; the size and shape of the microchannel of the sample vessel 12; the amount of fluid in the fluidic sample 52; and/or the size, shape, and material of the piezo transducer 14.

For example, when the sample vessel 12 is made of glass, the microchannel 22 has an aspect ratio of approximately 0.05 to approximately 0.125, and the sample vessel 12 has an aspect ratio of approximately 1.4 to approximately 1.9., the piezo transducer 14 may be configured to produce ultrasonic sound waves in the range of approximately 330 kHz to approximately 350 kHz.

The width of the microchannel 22 may be determined based at least on wave propagation speed inside the blood sample 52 (for example, approximately 1500 m/s) and using the predetermined desired number of nodes as one node in the middle of the microchannel 22, such that the frequency is approximately 330 kHz to approximately 350 kHz. The following formula may be used to determine, at least in part, a first node inside the microchannel 22 (with an exemplary 2000 μm width and 100 μm depth), without considering any minor reflection or other mirroring:

$$2f=v/\lambda$$

where f is the frequency, v the wave speed in fluid and A the wavelength (where the wavelength is ½ of the width of the microchannel 22).

Because the resonant frequency of the sample vessel 12 may be difficult to calculate precisely due to manufacturing and/or material variances, in one embodiment, the piezo transducer 14 may be configured to sweep the frequency within a frequency range having a plurality of frequencies, starting at a first frequency and proceeding through one or more second frequencies to a third frequency of the plurality of frequencies. In one embodiment, the piezo transducer 14 may be configured to sweep the frequency range in steps, such as steps of one kHz of frequency. In one embodiment, sweeping the frequency range from the first frequency to the third frequency ensures that the resonant frequency for the lysis device 10 plus the blood sample 52 is reached, even in light of variances in the geometry and materials of the lysis device 10.

In one embodiment, the piezo transducer 14 may be configured to sweep the frequency range between approximately 330 kHz and approximately 350 kHz, such as, in approximately one kHz steps. The piezo transducer 14 may be configured to sweep the frequency range starting approximately 330 kHz and going to approximately 350 kHz and/or the piezo transducer 14 may be configured to sweep the frequency range starting approximately 350 kHz and going to approximately 330 kHz, for example.

In one embodiment, the piezo transducer 14 may be configured to sweep the frequency range over a time period greater than zero seconds, and less than five seconds, less than four seconds, less than three seconds, less than two seconds, and/or less than one second. In one embodiment, the piezo transducer 14 may be configured to sweep the frequency range in a time period between approximately one and approximately two seconds.

In one embodiment, additionally or alternatively, the lysis device 10 may lyse the blood cells in the blood sample 52 by inducing shear and vibrating modes in the microchannel 22 of the sample vessel 12. Displacement of the rigid bonded ultrasonic piezo transducer 14, which may be primarily transverse displacement, causes vibration and movement of the sample vessel 12 bonded to the piezo transducer 14. When activated, the ultrasonic piezo transducer 14 changes shape, contracting and elongating (transverse displacement) as shown in FIG. 12. The movement of the ultrasonic piezo transducer 14, is translated to the sample vessel 12, changing the geometry and/or volume of the microchannel 22, which induces shear and vibrations in the microchannel 22 of the sample vessel 12. FIG. 12 shows a graphical representation of one example of the total displacement of the piezo transducer 14 in one exemplary operation of the piezo transducer 14.

The displacement of the piezo transducer 14 may result in bending of, vibrations and/or shear forces within, the sample vessel 12, which subsequently may cause and/or contribute to lysis of the blood sample 52 in the microchannel 22 of the sample vessel 12 due to a combination of high pressure, shear forces, and/or fluid movement inside the microchannel 22. Therefore, in some implementations, lysis of the blood sample 52 in the microchannel 22 may be caused by a combination of standing waves, pressure, cavitation, shear forces, and/or fluid movement within the blood sample 52.

Shear stress may be developed at the bond between the piezoelectric piezo transducer 14 and the sample vessel 12 when the piezo transducer 14 is activated. The shear stress may result in high pressures inside of the microchannel 22. For example, in one embodiment, a preferred high pressure may be approximately 5 MPa. In one embodiment, the pressure may be in a range of approximately 3 MPa to approximately 7 MPA. The level of pressure may be controlled by the level of contraction/elongation of the piezo transducer 14, which may depend on the electric field strength of the piezo transducer 14.

The combination of standing waves inside the microchannel 22 along with shear and/or vibrating of the sample vessel 12 causes significant cavitation in the whole blood sample 52 in the microchannel 22, which causes the rupture of the cell walls.

Referring now to FIGS. 15-18, in some embodiments, the lysis device 10, may be a component of an analyzer 100. The analyzer 100 may comprise the lysis device 10, an absorbance spectrophotometer 102, a fluidic distribution system 104 (for example, including a peristatic pump), and/or a controller 106. In one embodiment, the lysis device 10, is removeable and/or exchangeable from the other components of the analyzer 100. In one embodiment, the analyzer 100 may further comprise a mount 108 configured to receive and/or position the lysis device 10. In one embodiment, the lysis device 10, may be held (such as clamped) within the mount 108 such that the lysis device 10, is able to vibrate and/or move within a range of vibration and/or movement.

In one embodiment, the analyzer 100 may further comprise one or more processors 140 and one or more non-transitory computer readable medium 142. In one embodiment, the one or more processors 140 and the one or more non-transitory computer readable medium 142 may be part of the controller 106. However, it will be understood that one or more of the processors 140 and/or the non-transitory computer readable medium 142 may be located external to the controller 106 and/or external to the other components of the analyzer 100. In one implementation, the analyzer 100 may comprise and/or be connectable to one or more sensor cartridge 143 having blood gas sensors 144, and/or one or more reagents cartridge 145.

In one embodiment, the absorbance spectrophotometer 102 may comprise a transmitter 112 and a receiver 114 positioned adjacent to the sample vessel 12, the transmitter 112 is positioned to emit a light beam 116 through the top 40, the bottom 42, and the microchannel 22, and the receiver 114 is positioned to receive at least a portion of the light beam 116 after the portion of the light beam 116 has passed through the top 40, the bottom 42, and the microchannel 22. In one embodiment, the transmitter 112 may be a light source and the light beam 116 may be light. The light source may be one or more light emitting diode, for example. In one embodiment, the light may be white light having wavelengths in a range from approximately 450-700 nanometers.

The absorbance spectrophotometer 102 may be configured to measure the intensity of light in a part of the spectrum, especially as transmitted or emitted by particular substances in the fluidic sample 52 in the microchannel 22 of the sample vessel 12. The absorbance spectrophotometer 102 may be configured to measure how much a chemical substance absorbs light by measuring the intensity of light as a beam of light passes through the blood sample 52, or other fluidic sample 52. Each compound in the sample or solution absorbs or transmits light over a particular range of wavelengths.

The fluidic distribution system 104 (see FIG. 17) may have an inlet 120 (see FIG. 16) fluidly connectable to the first port 24, and an outlet 122 (see FIG. 16) fluidly connectable to the second port 26 of the sample vessel 12 of the lysis device 10. The fluidic distribution system 104 may move one or more fluidic samples 52, such as a blank sample or a blood sample or a washing solution, through the inlet 120 and through the first port 24 into the microchannel 22 of the sample vessel 12. In one embodiment, the fluidic distribution system 104 may flush the microchannel 22, expelling material within the microchannel 22 through the second port 26 of the sample vessel 12 and out of the outlet 122. The fluidic distribution system 104 may be operated automatically, manually, or a combination of automatically and manually.

The controller 106 may be electrically connected to the piezo transducer 14 of the lysis device 10. The controller 106 may be configured to provide electrical signals to the piezo transducer 14, that when received by the piezo transducer 14 cause the piezo transducer 14 to emit ultrasonic waves at one or more frequencies and/or a range of frequencies, including at the resonant frequency of the monolithic structure of the lysis device 10 plus the fluidic sample 52.

Figure 16:
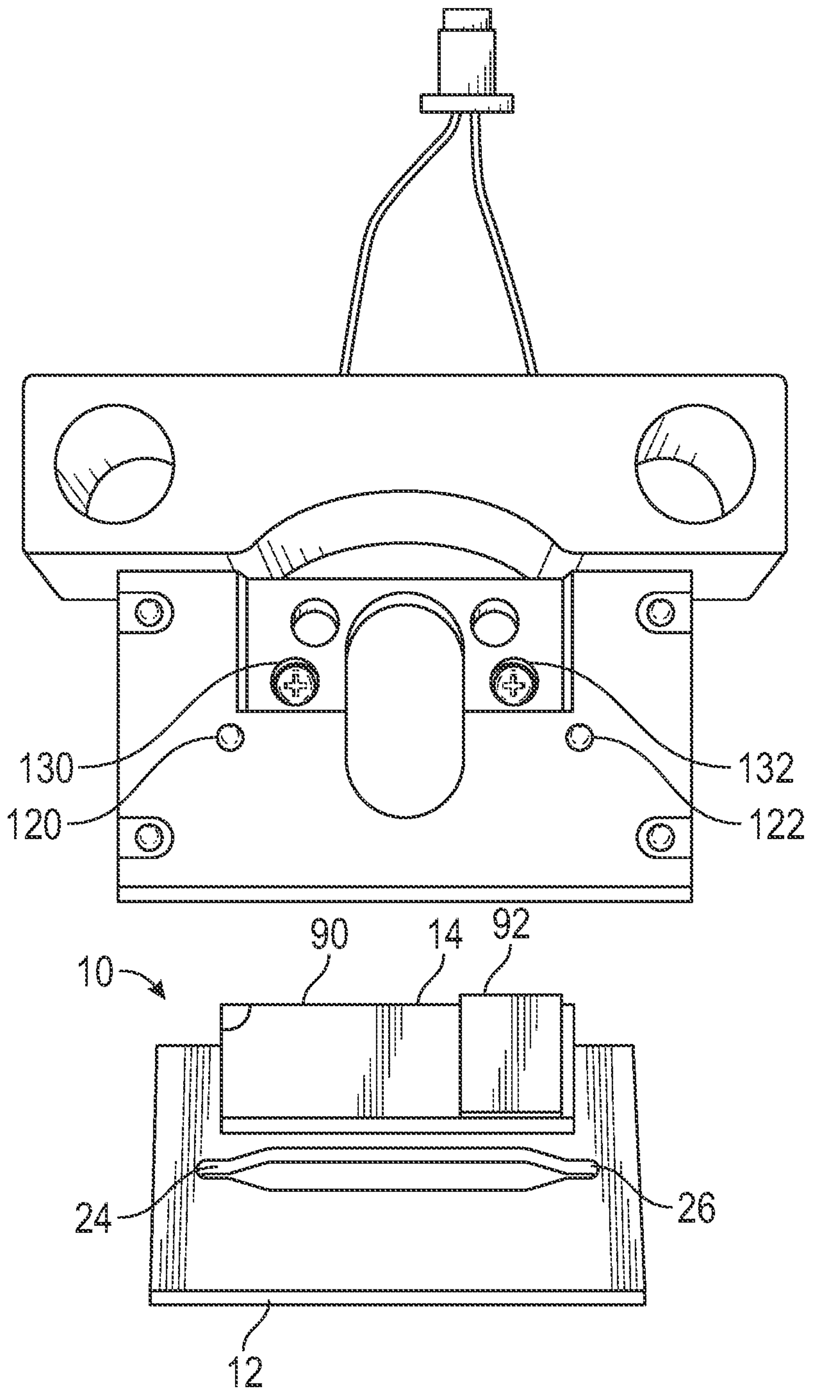
FIG. 16 is a perspective view of components of an exemplary analyzer in accordance with the present disclosure.

As shown in FIG. 16, in one embodiment the controller 106 may have a first electrical contact 130 and a second electrical contact 132. The first electric contact 130 and the second electric contact 132 may be electrically connectable to the first electrode 90 and the second electrode 92, respectively, of the piezo transducer 14 of the lysis device 10 such that electrical potential may be provided to the piezo transducer 14.

Figure 17:
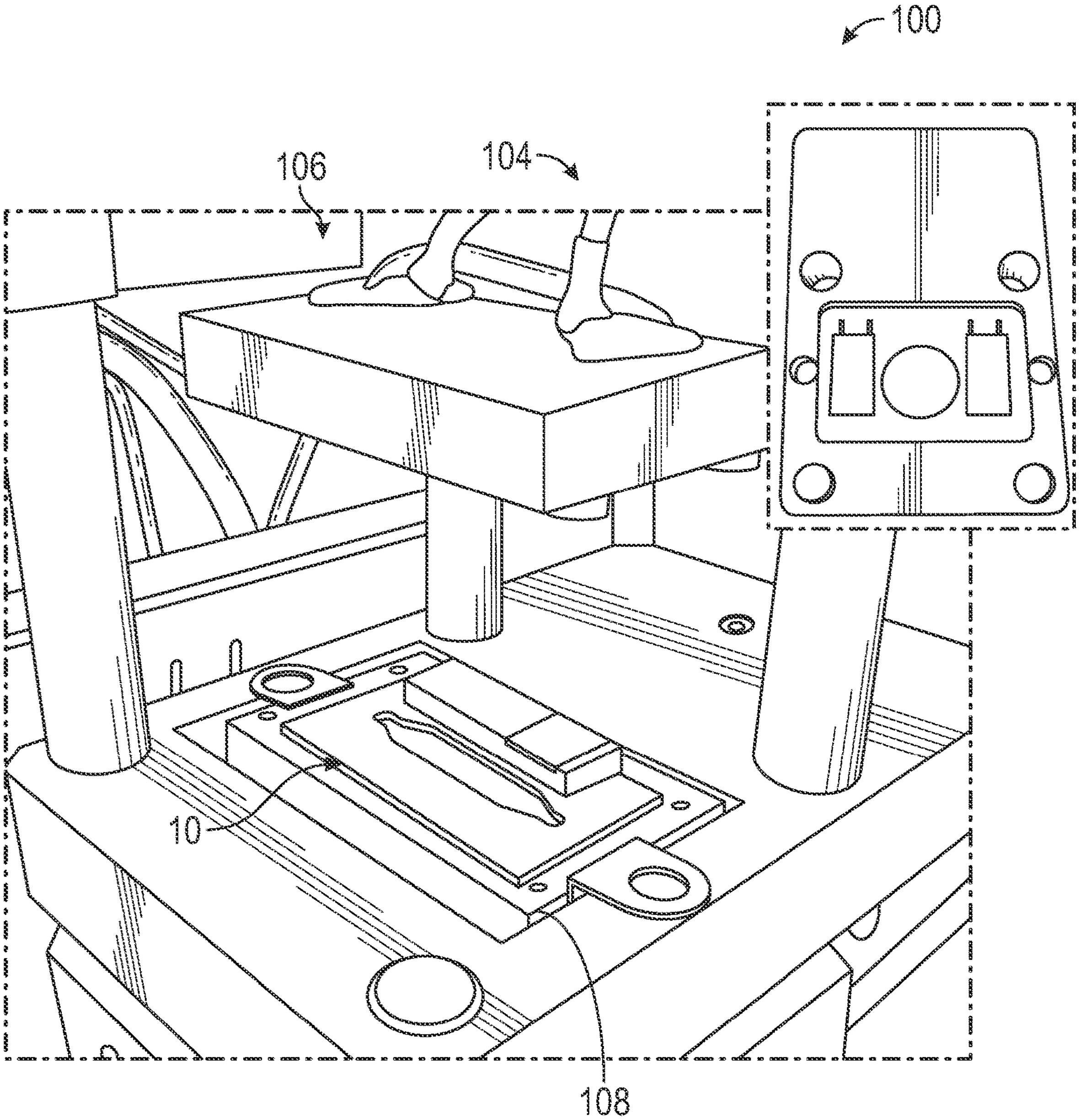
FIG. 17 is a perspective view of components of an exemplary analyzer in accordance with the present disclosure.
Figure 18:
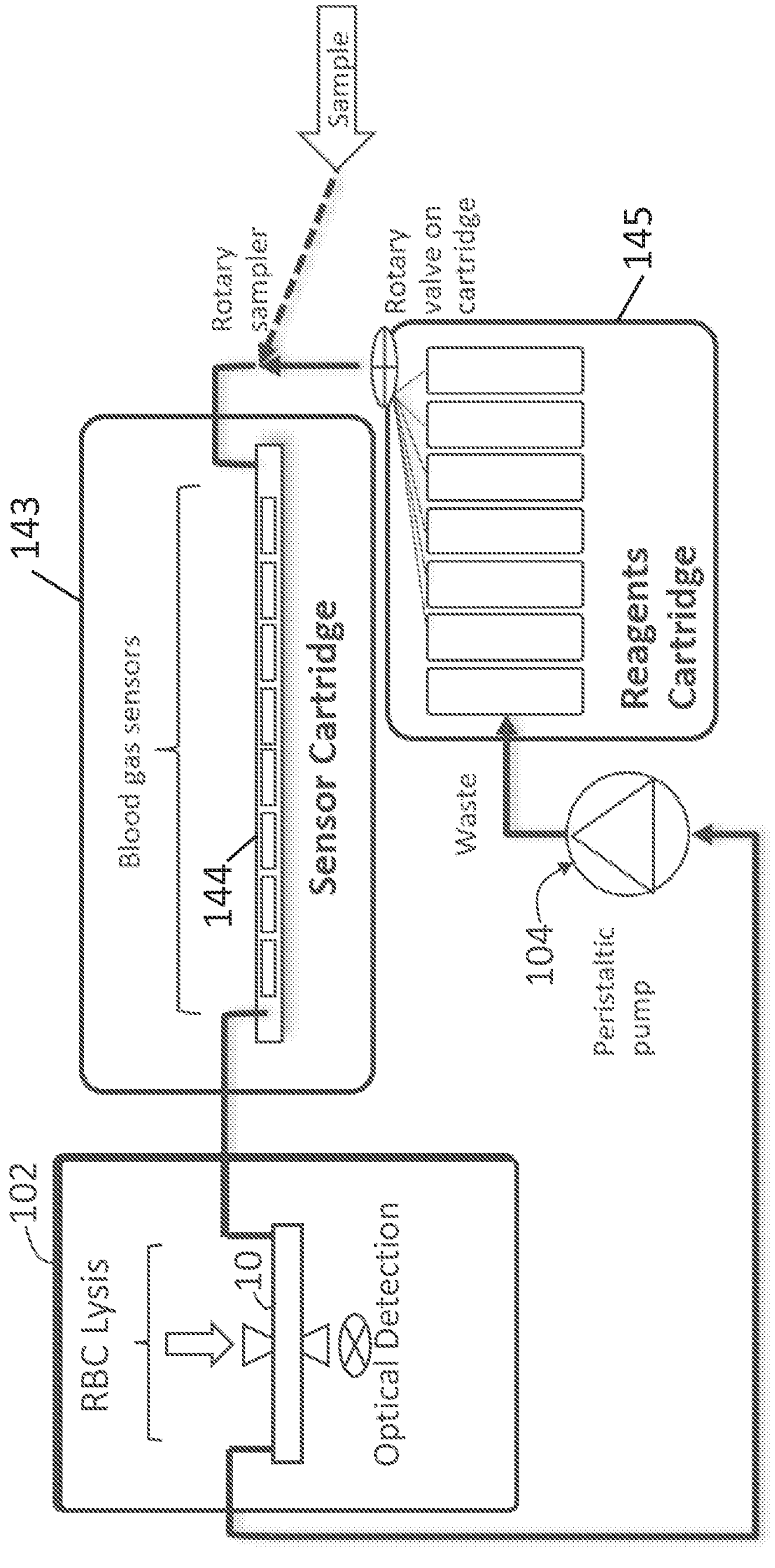
FIG. 18 is a schematic view of components of an exemplary analyzer in accordance with the present disclosure.

The mount 108 may hold the lysis device 10, in place between the transmitter 112 and the receiver 114 and may position the lysis device 10, to be operably connected to the fluidic distribution system 104 and the controller 106 (see FIG. 17). The mount 108 may be configured to stabilize the lysis device 10 in position without applying a force that would significantly change the impedance of the monolithic structure of the lysis device 10. For example, the mount 108 may include one or more clamps that apply a clamping force at or below approximately twenty newtons (N).

In one embodiment, the analyzer 100 may further comprise one or more digital temperature sensors and/or one or more thermal control elements (such as Peltier elements). In one embodiment, the analyzer 100 includes a side holder with two digital temperature sensors (near inlet and outlet) and two Peltier elements for thermal control.

In one embodiment, a method for analyzing blood may comprise obtaining or receiving a blood sample 52; inputting the lysis device 10, between the transmitter 112 and the receiver 114 of the absorbance spectrophotometer 102; inputting, with the fluidic distribution system 104, the blood sample 52 into the microchannel 22 of the sample vessel 12 via the inlet 120 and first port 24; activating the controller 106 to provide electrical signals to the piezo transducer 14, that when received by the piezo transducer 14 cause the piezo transducer 14 to emit ultrasonic waves at one or more frequencies and/or a range of frequencies, including at the resonant frequency of the monolithic structure of the lysis device 10 plus the blood sample 52, and/or cause the piezo transducer 14 to elongate and contract thereby producing shear forces in the blood sample 52 in the microchannel 22; such that cavitation is induced in the blood sample 52 causing the walls of the red blood cells of the blood sample 52 to rupture; activating the absorbance spectrophotometer 102 to transmit the light beam 116 from the transmitter 112 through the lysed blood sample 52 to the receiver 114.

The method may further comprise reading electrical signals generated by the receiver 114 to determine one or more oximetry parameters of the lysed blood sample 52 based at least in part on a signal indicative of the light received by the receiver 114 of the absorbance spectrophotometer 102.

Figure 19:
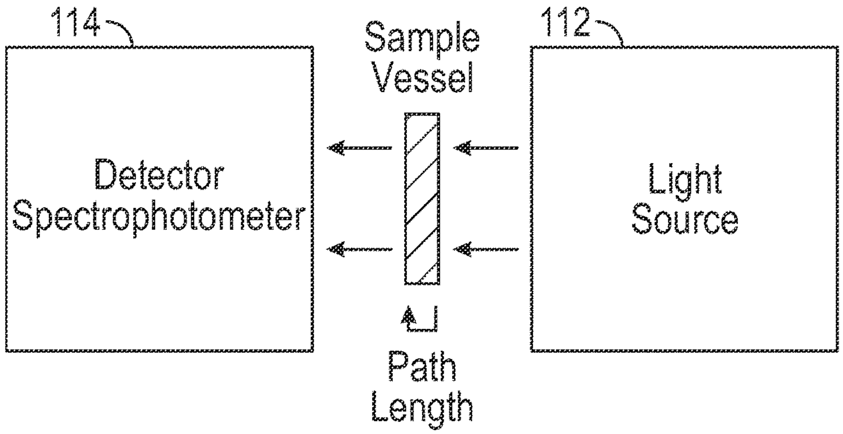
FIG. 19 is a schematic of determination of an absorption spectrum in accordance with the present disclosure.
Figure 20:
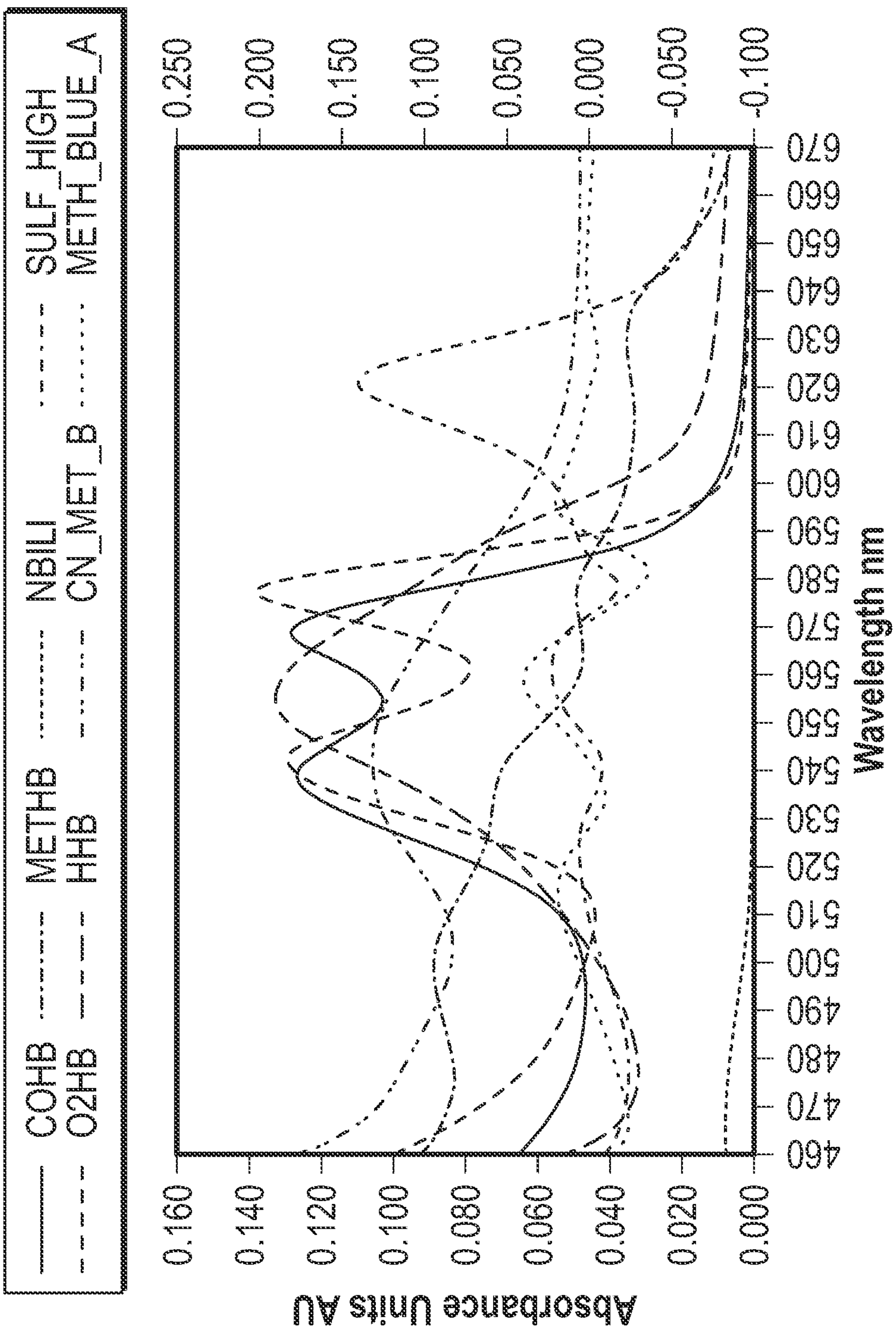
FIG. 20 illustrates spectral profile coefficients of the hemoglobin forms.

As shown in FIG. 19, an absorption spectrum may be calculated based on known calculations for absorption for liquid mediums. Further, as shown in FIG. 20, determining one or more oximetry parameters may further comprise analyzing spectral profile coefficients of hemoglobin forms, such as one or more of the following: Oxyhemoglobin (O2HB), Deoxyhemoglobin (HHB), Carboxyhemoglobin (COHB), Methemoglobin (METHB), and plasma Bilirubin (NBILI), and interfering substances Cyan Methemoglobin (CN_MET_B), Sulfhemoglobin (SULF_HIGH), and Methylene blue (METH_BLUE_A).

Determining one or more oximetry parameters may be based on measurement of spectrophotometric optical absorption, that is the absorption of light by components in the blood sample 52.

Determining one or more oximetry parameters may comprise measuring at least total hemoglobin (THB) and one or more of hemoglobin fractions, such as the following: Oxyhemoglobin (O2HB), Deoxyhemoglobin (HHB), Carboxyhemoglobin (COHB) Methemoglobin (METHB).

In one embodiment, the method may comprise inputting and evacuating a wash solution into the microchannel 22 of the sample vessel 12 before and/or after introducing the blood sample 52 into the microchannel 22. The method may further comprise activating the piezo transducer 14 to produce waves and/or shear forces to agitate the wash solution in the microchannel 22. In one embodiment, the sample vessel 12 may be used, cleaned, and re-used. In one embodiment, the lysis device 10, may not be reusable, and may be replaced for each new blood sample 52. In this embodiment, the lysis device 10 may be discarded after a single use.

The method may further comprise calibrating the analyzer with a blank sample. In one embodiment, the fluidic sample 52 may be a test sample known as a "blank sample" that may be used to calibrate the analyzer 100 and has known optical characteristics/properties. The blank sample may contain a die solution, which may be used to measure scattering of the transmission of light through the medium.

In one embodiment, the blood sample 52 may be approximately twelve microliters in volume. The blood sample typically comprises plasma and red blood cells (which may comprise 45%-60% of the blood sample) and possibly lipids.

In one embodiment, the blood sample 52 is held at a consistent temperature. In one embodiment, the temperature of the blood sample 52 is thirty-seven degrees Celsius plus or minus approximately 0.3 degrees. In one embodiment, the temperature of the blood sample 52 is less than forty-five degrees Celsius, and preferably less than forty degrees Celsius, to avoid damage to the blood sample 52. In one embodiment, the blood sample 52 is held at a substantially consistent temperature utilizing the one or more digital temperature sensors and/or the one or more thermal control elements. Thermal control can be used to keep the patient's blood sample at a constant temperature for accurately measuring the blood sample oximetry analytes.

An example of the analyzer 100 and the lysis device 10, in use will now be described. In one example, the sample vessel 12 may be made of glass and may have a length-to-width aspect ratio in a range of about 1.4 to about 1.9, and the microchannel 22 may have a height-to-width aspect ratio of about 0.05 (for example, having a height of about 100 micrometers and a width of about two millimeters). The sample vessel 12 may be inserted in a path that the light beam will travel between the transmitter 112 and the receiver 114 of the absorbance spectrophotometer 102. It should be understood that the analyzer 100 may be provided with various instruments including mirrors and/or wave-guides to direct the light beam through the path. The fluidic distribution system 104 may insert the blood sample 52 into the microchannel 22 of the sample vessel 12.

The controller 106 may be electrically connected to the piezo transducer(s) 14 of the sample vessel 12, and may provide electrical signals to the piezo transducer(s) 14 to cause the piezo transducer 14 to emit ultrasonic sound waves through a range of frequencies from approximately 330 kHz to approximately 350 kHz in steps of approximately one kHz. The range of frequencies may be transmitted within a time period of approximately two seconds.

In one embodiment, the non-transitory computer readable medium 142 may store computer executable instructions that when executed by one or more processors 140 of the controller 106 may cause the one or more processors 140 to pass signals to the piezo transducer(s) 14 connected to the sample vessel 12 having a microchannel 22 containing a whole blood sample 52 having blood cells and plasma, that cause the piezo transducer 14(*s*) to emit ultrasonic waves into the sample vessel 12 at a frequency, intensity and duration to induce cavitation in the blood sample such that the acoustic standing waves are configured to rupture, i.e., lyse the blood cells within the whole blood sample 52, and thereby configured to release hemoglobin from within the blood cells into the plasma. In some embodiments, the sample can be pre-separated plasma and in this case such sample can be analyzed without lysing the red blood cells, that is without causing the piezo transducer 14 to emit ultrasonic sound waves through a range of frequencies from approximately 330 kHz to approximately 350 kHz.

The frequency range includes the resonant frequency for the monolithic structure of the lysis device 10 with the blood sample 52, thereby causing cavitation in the blood sample 52, which ruptures the cell walls of the blood cells in the blood sample 52. Additionally, or alternatively, the controller 106 may cause the one or more processors 140 to pass signals to the piezo transducer(s) 14 that cause the piezo transducer(s) 14 to elongate and contract, thereby inducing cavitation, i.e., producing shear forces, in the blood sample 52 such that the acoustic standing waves are configured to rupture, i.e., the cell walls of the blood cells in the blood sample 52 and release hemoglobin from within the blood cells into the plasma.

A majority (more than 50%) of the cell walls of the blood cells may be ruptured.

The transmitter 112 of the absorbance spectrophotometer 102 may be activated to transmit the light beam 116, such as light, through the sample vessel 12 into the lysed blood sample 52. The receiver 114 may receive at least portions of the light beam 116 that exits the lysed blood sample 52 and the sample vessel 12. The receiver 114 may include one or more photodiodes, for example, for generating an electrical signal due to reception of the light beam 116.

The analyzer 100, or the one or more computer processors 140, may determine one or more analytes present in the lysed blood sample 52 based at least in part on a signal indicative of the light received by the receiver 114 of the absorbance spectrophotometer 102. The analyzer 100, or one or more computer processors, may further analyze spectral profile coefficients of hemoglobin forms, such as one or more of the following: Oxyhemoglobin (O2HB), Deoxyhemoglobin (HHB), Carboxyhemoglobin (COHB), Methemoglobin (METHB), and plasma Bilirubin (NBILI), and interfering substances Cyan Methemoglobin (CN-_MET_B), Sulfhemoglobin (SULF_HIGH), Methylene blue (METH_BLUE_A).

The analyzer 100, or the one or more computer processors 140, may measure total hemoglobin (THB) and/or one or more of hemoglobin fractions, such as the following: Oxyhemoglobin (O2HB), Deoxyhemoglobin (HHB), Carboxyhemoglobin (COHB), Methemoglobin (METHB).

The analyzer 100, or the one or more computer processors 140, may output the result of the analyses. The output may be shown on one or more display. The output may be used to determine treatment of the patient.

Figure 21:
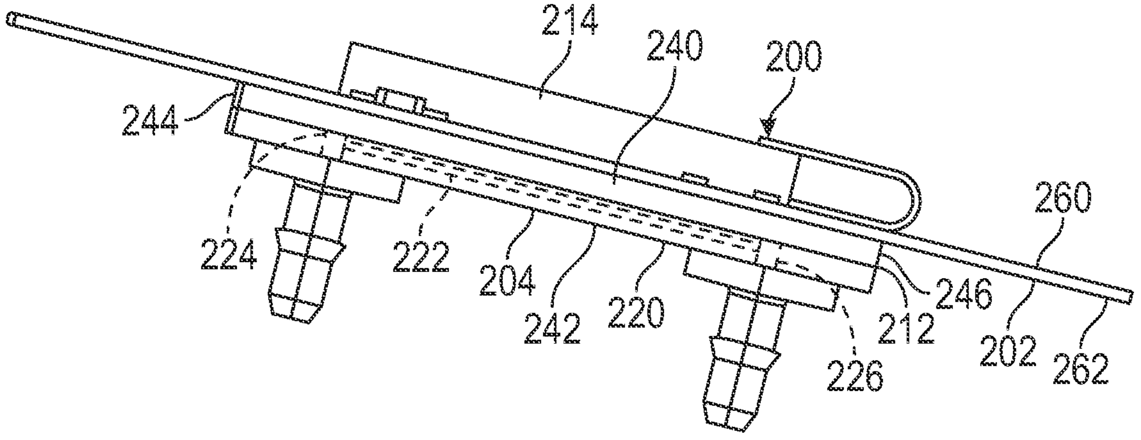
FIG. 21 is a side perspective view of an assembly constructed in accordance with the present disclosure.
Figure 22:
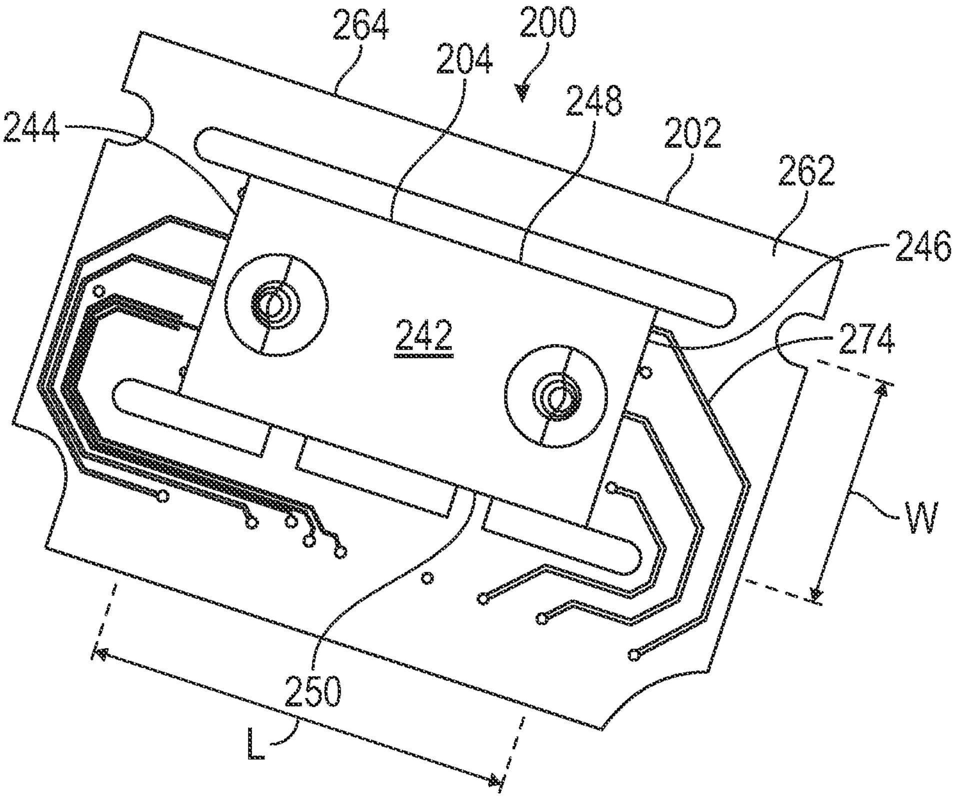
FIG. 22 is a bottom plan view of the assembly depicted in FIG. 21.
Figure 23:
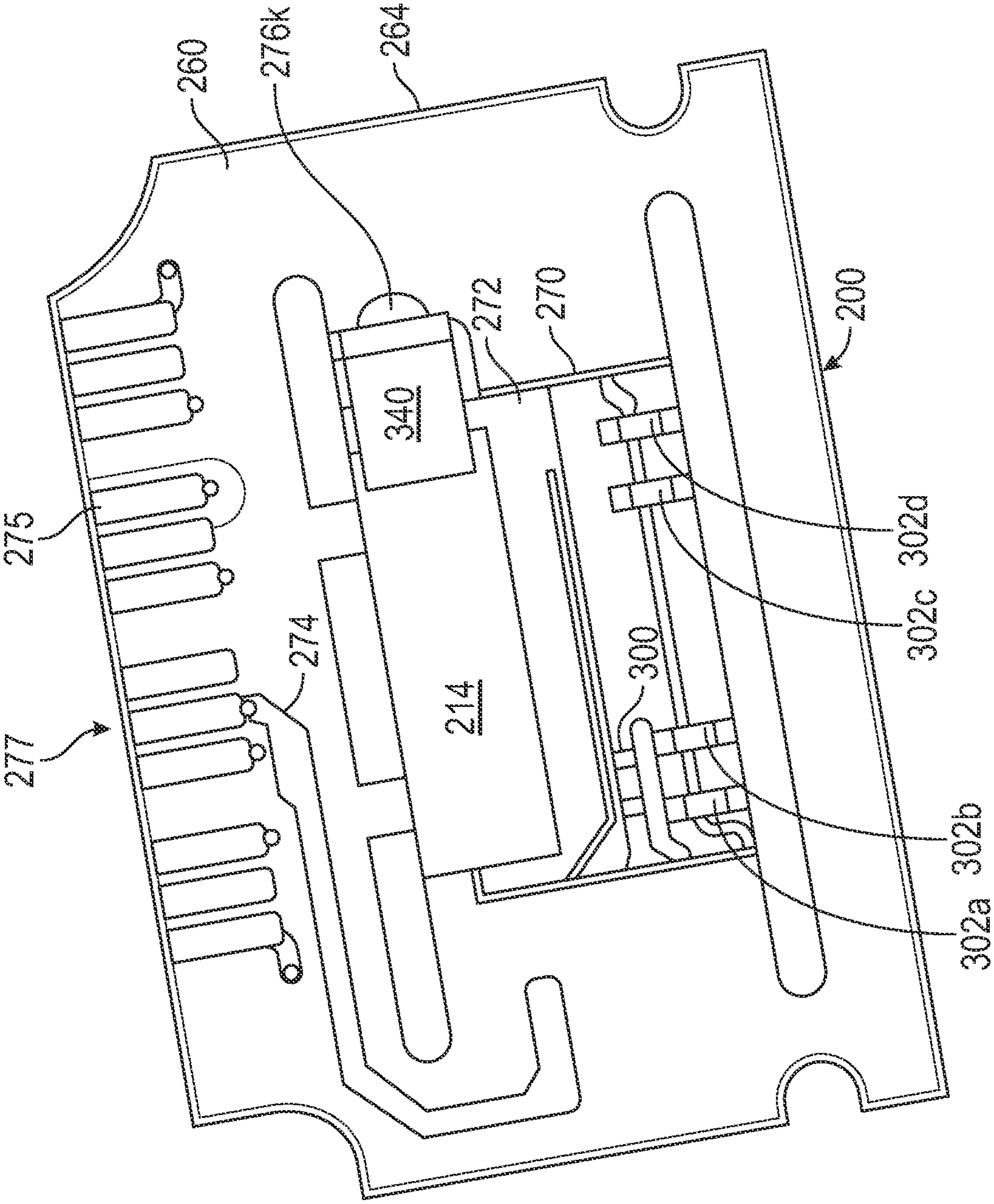
FIG. 23 is a top plan view of the assembly depicted in FIG. 21.

Referring to FIGS. 21-23, shown therein and designated by reference 200 is an assembly constructed in accordance with the present disclosure. The assembly 200 is provided with a support substrate 202, and an acoustophoresis device 204 that is preferably permanently bonded to the support substrate 202 in a non-clamping manner. This non clamping manner is done in order to minimize vibrational losses between the support substrate 202 and the acoustophoresis device 204, this is what is referred to as a near zero mass interface. Previous studies have shown that as additional mass is added to the assembly 200, the ability to hemolyze the blood decreases. If the acoustophoresis device 204 is mechanically constrained (e.g., attached to the support substrate 202) by clamping, the acoustic wave/energy is transferred to the whole connected assembly and therefore less energy is available for the build up of a standing wave field in the microchannel 22. A zero mass interface means a connection which does not add additional mass to the acoustophoresis device 204, which is a theoretical ideal state, in practice the support substrate 202 adds additional mass to the acoustophoresis device 204. As will be explained in more detail below, the acoustophoresis device 204 may be attached to the support substrate 202 in a manner to permit the acoustophoresis device 204 to vibrate more freely than if the acoustophoresis device 204 was connected to the support substrate 202 with a clamping method. Further, the acoustophoresis device 204 may be attached to the support substrate 202 in a manner that provides a near zero mass interface that provides for efficient excitation (e.g., voltage less than 150Vp-p, and in some embodiments between 80Vp-p and 100Vp-p) and magnitude and phase response signals.

In some embodiments, the acoustophoresis device 204 is provided with a sample vessel 212 and a piezo transducer 214 bonded to the sample vessel 212. In some embodiments, the piezo transducer 214 extends through an opening 272 of the support substrate 202 (see FIGS. 23, 24). In one embodiment, the acoustophoresis device 204 is a monolithic structure, such as that formed by the sample vessel 212 and the piezo transducer 214 bonded together using a suitable bonding material, such as epoxy.

The sample vessel 212 has an outer surface 220, a microchannel 222 (shown in phantom within FIG. 21) within the confines of the outer surface 220, a first port 224 extending through the outer surface 220 to the microchannel 222 and in fluid communication with the microchannel 222, and a second port 226 extending through the outer surface 220 to the microchannel 222 and in fluid communication with the microchannel 222. In one embodiment, the outer surface 220 has a mounting area for the piezo transducer 214.

In one embodiment, the sample vessel 212 has a top 240, a bottom 242, a first end 244, a second end 246, a first side 248, and a second side 250, wherein the first side 248 and the second side 250 extend between the first end 244 and the second end 246 and between the top 240 and the bottom 242. In one embodiment, the top 240 and the bottom 242 are planar. In one embodiment, the first side 248 and the second side 250 are planar. In one embodiment, the first end 244 and the second end 246 are planar. In one embodiment, the top 240, the bottom 242, the first end 244, the second end 246, the first side 248, and the second side 250 cooperate to form a three-dimensional rectangular cuboid. In some embodiments, the piezo transducer 214 matingly engages the outer surface 220 of the sample vessel 212. For example, the piezo transducer 214 and the outer surface 220 may have planar surfaces configured to be positioned together.

The sample vessel 212 may be partially, substantially, or completely transparent. In one embodiment, the sample vessel 212 is transparent at least above and below the microchannel 222, such that a light beam may pass through the sample vessel 212 through the microchannel 222, interact with any substance within the microchannel 222, and pass out of the sample vessel 212.

The sample vessel 212 may be constructed of glass. In one embodiment, the sample vessel 212 may be constructed of a material (glass or non-glass) having a Young's modulus within a range from about 50 Gpa to about 90 Gpa. The material property known as Young's modulus, or the modulus of elasticity, is a measure of the ability of the material to withstand changes in length when under lengthwise tension or compression. Young's modulus is equal to the longitudinal stress divided by the strain. In one embodiment, the sample vessel 212 may be constructed of plastic with a rigidity and/or Young's modulus similar to that of glass. In one embodiment, the sample vessel 212 may be constructed from alkali borosilicate glass. One example of alkali borosilicate glass is made by Schott Advanced Optics, located at 400 York Avenue, Duryea, PA 18642, and marketed under the name "D 263 T ECO Thin Glass."

The sample vessel 212 has a length L from the first end 244 to the second end 246, a width W from the first side 248 to the second side 250, a thickness between the top 240 and the bottom 242, and an aspect ratio defining the proportional relationship between the length and the width. The sample vessel 212 has a longitudinal axis along the length and a latitudinal axis along the width.

In one embodiment, the aspect ratio of the sample vessel 212 is in a range from approximately 0.5 to approximately 3.0. In one embodiment, the aspect ratio of the sample vessel 212 is in a range from approximately 1.4 to approximately 1.9. In one embodiment, the length may be approximately twenty-two millimeters and the width may be approximately twelve millimeters. In one embodiment, the length may be approximately seventeen millimeters and the width may be approximately twelve millimeters. In one embodiment, the length may be approximately seventeen millimeters and the width may be approximately six millimeters. In one embodiment, the length may be approximately twelve millimeters and the width may be approximately six millimeters.

The microchannel 222 may be configured to receive a fluidic sample (including, but not limited to, a blood sample, a "blank" sample, and/or a washing solution sample) through the first port 224 and/or the second port 226. The microchannel 222 has a length, a width, and a height. Typically, the length of the microchannel 222 is oriented along the longitudinal axis of the sample vessel 212 and the width of the microchannel 222 is oriented along the latitudinal axis of the sample vessel 212. However, it will be understood that the microchannel 222 may be oriented at an angle from or offset from the longitudinal axis and/or the latitudinal axis of the sample vessel 212.

The microchannel 222 has an aspect ratio defining the proportional relationship between the width and the height of the microchannel 222. In one embodiment, the width to height aspect ratio of the microchannel 222 is in a range from approximately 0.04 to approximately 0.175. In one embodiment, the width to height aspect ratio of the microchannel 222 is in a range from approximately 0.04 to approximately 0.125. In one embodiment, the width to height aspect ratio of the microchannel 222 is approximately 0.05.

In one embodiment, the width of the microchannel 222 is about two millimeters. In one embodiment, the width of the microchannel 222 is about 2.5 millimeters. In one embodiment, the width of the microchannel 222 is greater than an illumination width of a light yield area of the absorbance spectrophotometer 102. An illumination width may be defined as the width of a cross-section of the light yield along an optical pathway from the absorbance spectrophotometer 102 where the optical pathway intersects the microchannel 222. For example, when the illumination diameter is between one millimeter and 1.5 millimeters, then the width of the microchannel 222 may be at least approximately 1.6 millimeters. The width of the microchannel 222 may be determined to allow for adequate mechanical alignment between the microchannel 222 and optical pathway. For example, for an illumination width between 1 millimeter and 1.5 millimeters, the width of the microchannel 222 may be approximately two millimeters.

In one embodiment, the length of the microchannel 222 may be between approximately ten millimeters and approximately twelve millimeters. In one embodiment, the length of the microchannel 222 may be at least approximately four millimeters. In one embodiment, the length of the microchannel 222 may be between approximately four millimeters and approximately twenty millimeters.

In one embodiment, the length of the microchannel 222 may be based at least in part on a predetermined desired number of nodes to be created in the microchannel 222. For example, for a microchannel 222 having a width of approximately two millimeters and where a whole blood wave propagation speed is approximately 1500 m/s, a calculated single node is at 350 kHz. The nodes may be distributed in the microchannel 222 evenly spaced along the length of the microchannel 222 (for example, 2×2 mm=4 mm), where high pressure creates a uniform distribution of lysed blood. For example, if the predetermined desired number of nodes is five nodes on each side wall of the microchannel 222 (see FIG. 13), then the length of the microchannel 22 may be set at approximately seventeen millimeters.

The height of the microchannel 222 can vary, as discussed below. The height of the microchannel 222 may be based on the amount of absorption in lysed blood of the light yield from the absorbance spectrophotometer 102 and the desired precision of the absorption. For example, the desired absorption may be at approximately one Optical Density (OD).

In one embodiment, the height of the microchannel 222 is about 100 micrometers. In one embodiment, the height of the microchannel 222 is about 150 micrometers. In one embodiment, the height of the microchannel 222 is about 250 micrometers. In one embodiment, the height of the microchannel 222 is about 300 micrometers. In one embodiment, the height of the microchannel 222 is between approximately 80 micrometers and approximately 300 micrometers. In one embodiment, the height of the microchannel 222 is between approximately 80 micrometers and approximately 150 micrometers.

The first port 224 and the second port 226 are fluidly connected to the microchannel 222 and extend from the microchannel 222 through the outer surface 220 of the sample vessel 212. In one embodiment, the first port 224 is fluidly connected to the microchannel 222 and may extend from the microchannel 222 to the top 240, the bottom 242, the first end 244, the second end 246, the first side 248, and/or the second side 250 of the sample vessel 212. In the example shown in FIG. 21, the first port 224 and the second port 226 extend from the bottom 242 of the sample vessel 212 to the microchannel 212. In one embodiment, the second port 226 is fluidly connected to the microchannel 222 and may extend from the microchannel 222 to the top 240, the bottom 242, the first end 244, the second end 246, the first side 248, and/or the second side 250 of the sample vessel 212. The first port 224 and the second port 226 may extend to the same or to different ones of the top 240, the bottom 242, the first end 244, the second end 246, the first side 248, and/or the second side 250.

In one embodiment, the first port 224 and the second port 226 each have a diameter of between approximately 0.5 millimeter (500 micrometers) and approximately 1.5 millimeters (1500 micrometers). In one embodiment, the first port 224 and the second port 226 each have a diameter of approximately 0.8 millimeter (800 micrometers). The microchannel 222 tapers toward the first port 224 and towards the second port 226, such as shown in FIG. 11B. The taper assists in providing the fluid to and/or from the first port 224. The cross-sectional width (e.g., diameter) of the first port 224 and the second port 226 are smaller than the width of the microchannel 222. For example, a cross-sectional width of the first port 224 and the second port 226 can be from 50% to 100% of the width of the microchannel 222.

The sample vessel 212 may be a monolithic fabrication, either in that the sample vessel 212 is formed from a single piece of material or in that the sample vessel 212 is formed from a plurality of pieces that are interconnected to form a unified whole. As will be discussed in more detail with respect to FIG. 24, the sample vessel 212 may be formed from two substrates that are bonded together, such as shown in FIG. 11B. Alternatively, the sample vessel 212 may be formed from three substrates that are bonded together, as shown in FIG. 11A. Returning to FIG. 21, the piezo transducer 214 is mounted to the sample vessel 212 (such as to the mounting area of the outer surface 220) to form the monolithic structure of the acoustophoresis device 204 after assembly. The piezo transducer 214 may have a mounting area that mounts to the mounting area of the outer surface 220. In one embodiment, the piezo transducer 214 is mounted at least partially to the top 240 of the sample vessel 212; however, it will be understood that the piezo transducer 214 may be mounted to the top 240, the bottom 242, the first end 244, the second end 246, the first side 248, and/or the second side 250. The piezo transducer 214 is positioned in relation to the microchannel 222 such that the piezo transducer 214 does not block light from moving through the microchannel 222 from the top or the bottom of the sample vessel 212. The piezo transducer 214 may be offset from the microchannel 222 such that the piezo transducer 214 allows light to enter the microchannel 222 from outside of the sample vessel 212. In one embodiment, the piezo transducer 214 has a length and a longitudinal axis along the length that is orientated substantially parallel (e.g., within five degrees of parallel) to the longitudinal axis of the sample vessel 212. In one embodiment, the piezo transducer 214 has a width that is smaller than the length of the piezo transducer 214.

The piezo transducer 214 may be positioned on the opposite side from one or both of the first port 224 and the second port 226 or on the same side as one or more of the first port 224 and the second port 226 on the sample vessel 212. The piezo transducer 214 may be constructed and operated in a similar manner as the piezo transducer 14 described above, piezo transducer The support substrate 202 is provided with an upper surface 260, a lower surface 262 opposite the upper surface 260 and an outer peripheral edge 264 (see FIG. 22). The support substrate 202 also has an inner edge 270 defining the opening 272 intersecting the upper surface 260 and the lower surface 262. The sample vessel 212 is connected to at least one of the upper surface 260 and the lower surface 262. In the example shown, the piezo transducer 214 passes through the opening 272. In some embodiments, the piezo transducer 214 and the sample vessel 212 extend in opposite directions relative to the support substrate 202. For example, the piezo transducer 214 may pass through the opening 272 and extend beyond the upper surface 260 of the support substrate 202. As shown in FIG. 21, the sample vessel 212 is connected to the lower surface 262 and extends from the lower surface 262 without passing into or through the opening 272 in the support substrate 202.

In some embodiments, the support substrate 202 includes a predetermined pattern of conductive traces 274 (see FIGS. 22, 23) on at least one of the upper surface 260 and the lower surface 262. As will be described in more detail below, the conductive traces 274 allow for electrical connections to be made to heating elements and respective control systems, as well as providing for an apparatus configured for capacitive fluid detection. In some embodiments, the controller 106 is electrically connected to the piezo transducer 214 and is configured to simultaneously drive the piezo transducer 214 and also receive response signals from the piezo transducer 214. The controller 106 may be electrically connected to the piezo transducer in a manner devoid from the conductive traces 274 (and instead be electrically connected via at least one wire), or the controller 106 may be electrically connected to the piezo transducer 214 with at least one of the conductive traces 274. At least some of the conductive traces 274 include a connector portion 275 (see FIG. 23) adjacent to the outer peripheral edge 264 (see FIGS. 23, 27). In the example shown, the conductive traces 274 include 12 connector portions 275, which are labeled as 275*a-l* for purposes of clarity (see FIG. 27). At least some of the conductive traces 274 also include a mounting pad 276 (see FIG. 28). The connector portions 275 adjacent to the outer peripheral edge 264 form a male edge connector 277. The mounting pad 276 may be connected to a particular one of the connector portions 275 with a wire 278 (see FIG. 27). The wire 278 can extend on the upper surface 260 or the lower surface 262 of the support substrate 202. Further, the wire 278 can extend between the lower surface 262 and the upper surface 260 with the use of a through via, for example.

Figure 27:
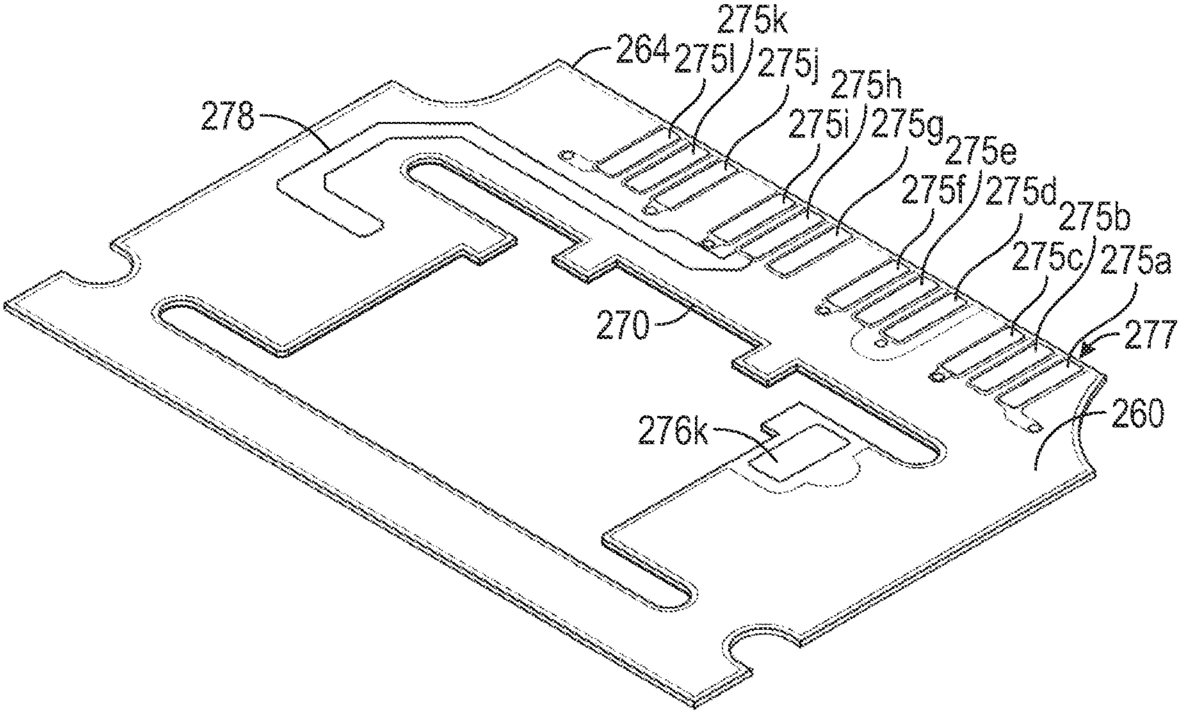
FIG. 27 is a top perspective view of a support substrate constructed in accordance with the present disclosure.
Figure 28:
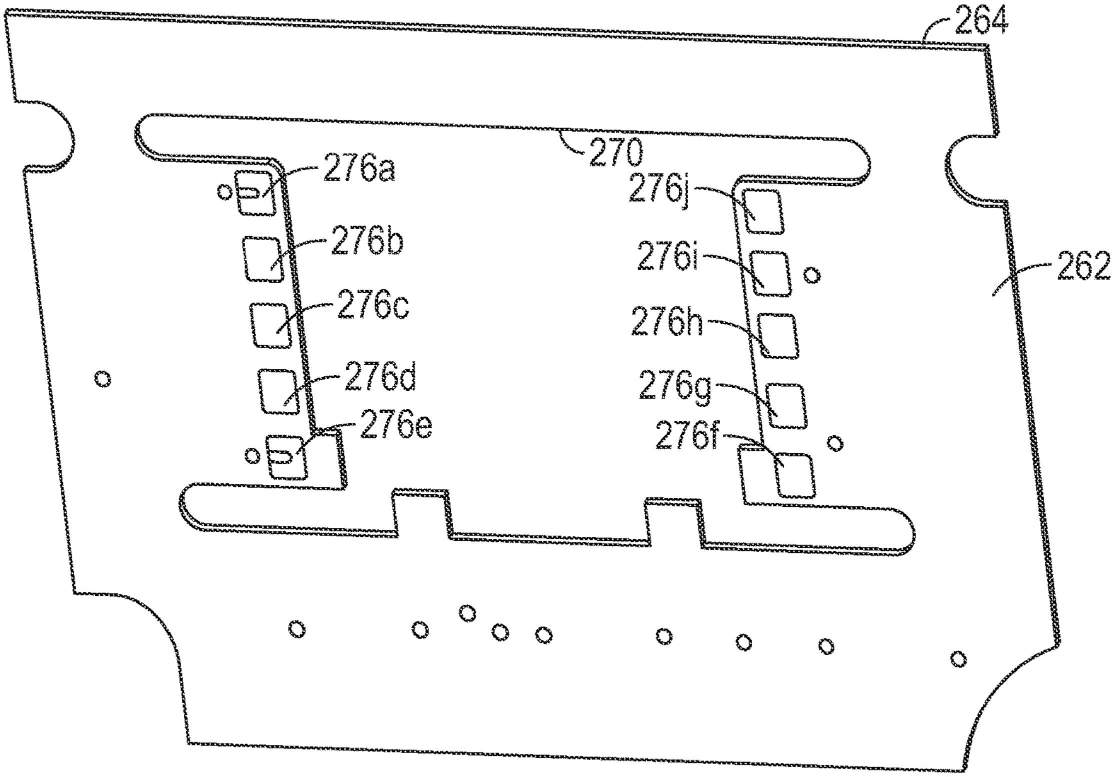
FIG. 28 is a bottom perspective view of the support substrate depicted in FIG. 27.

In the example shown in FIG. 28, the support substrate 202 is provided with ten mounting pads 276 labeled as mounting pads 276*a-j* on the lower surface 262, and one mounting pad 276*k* on the upper surface 260 (see FIG. 27). The mounting pads 276*a-k* are electrically connected to corresponding ones of the connector portions 275*a-l* to permit electrical signals to be transmitted to and/or received from the mounting pads 276*a-k*. More or less of the mounting pads 276 can be provided on the support substrate 202. When the sample vessel 212 is connected to the support substrate 202, at least two of the mounting pads 276 are bonded to the sample vessel 212.

In some embodiments, the support substrate 202 may be a printed circuit board (PCB) that is constructed of plastic and fiber resins. Standard materials for printed circuit board fabrication are FR4 G10 fiberglass epoxy, phenolic, polyimide, and the like.

Figure 25:
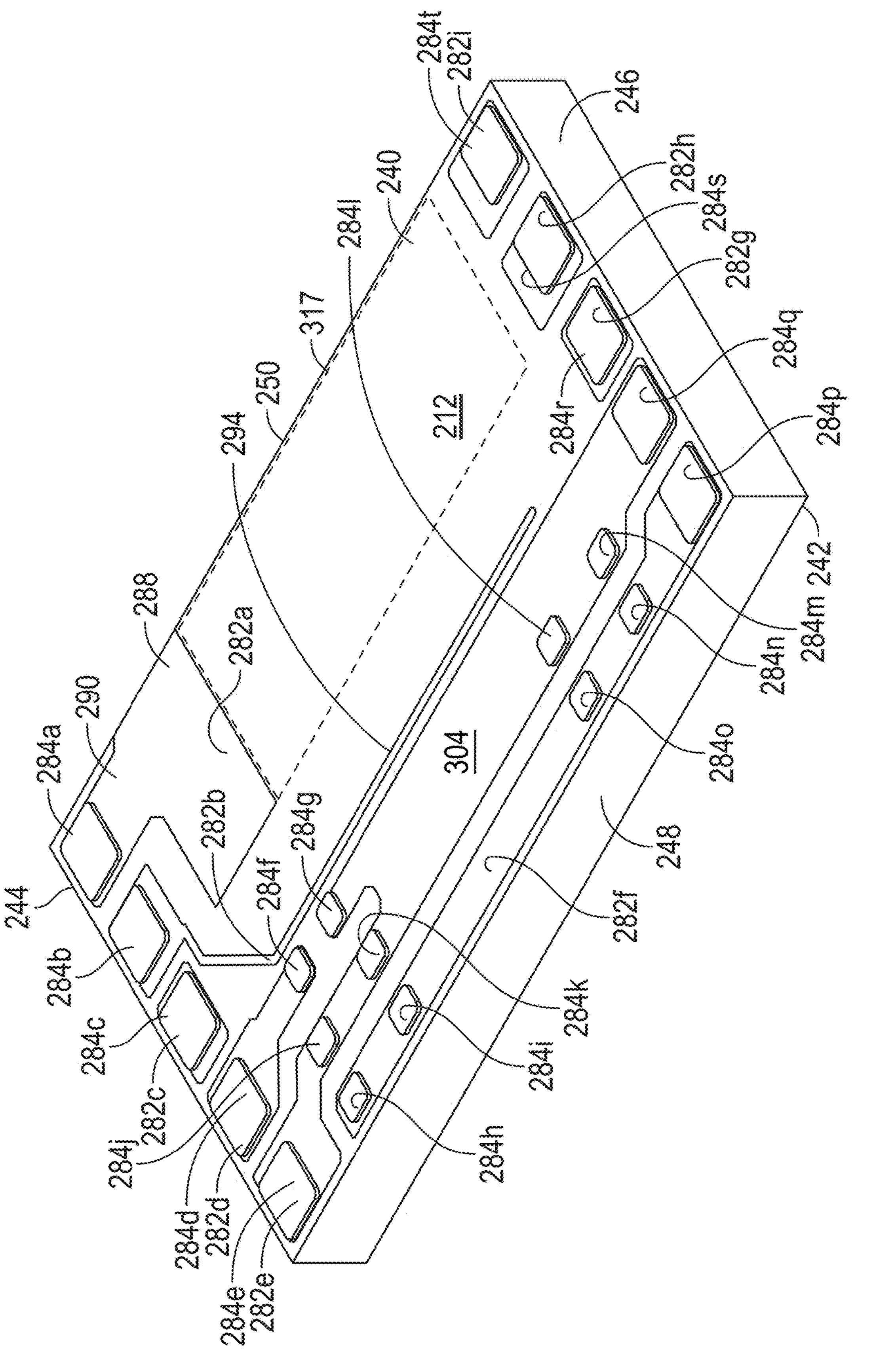
FIG. 25 is a top perspective view of a sample vessel constructed in accordance with the present disclosure, the sample vessel including conductive traces extending across the top surface thereof.
Figure 26:
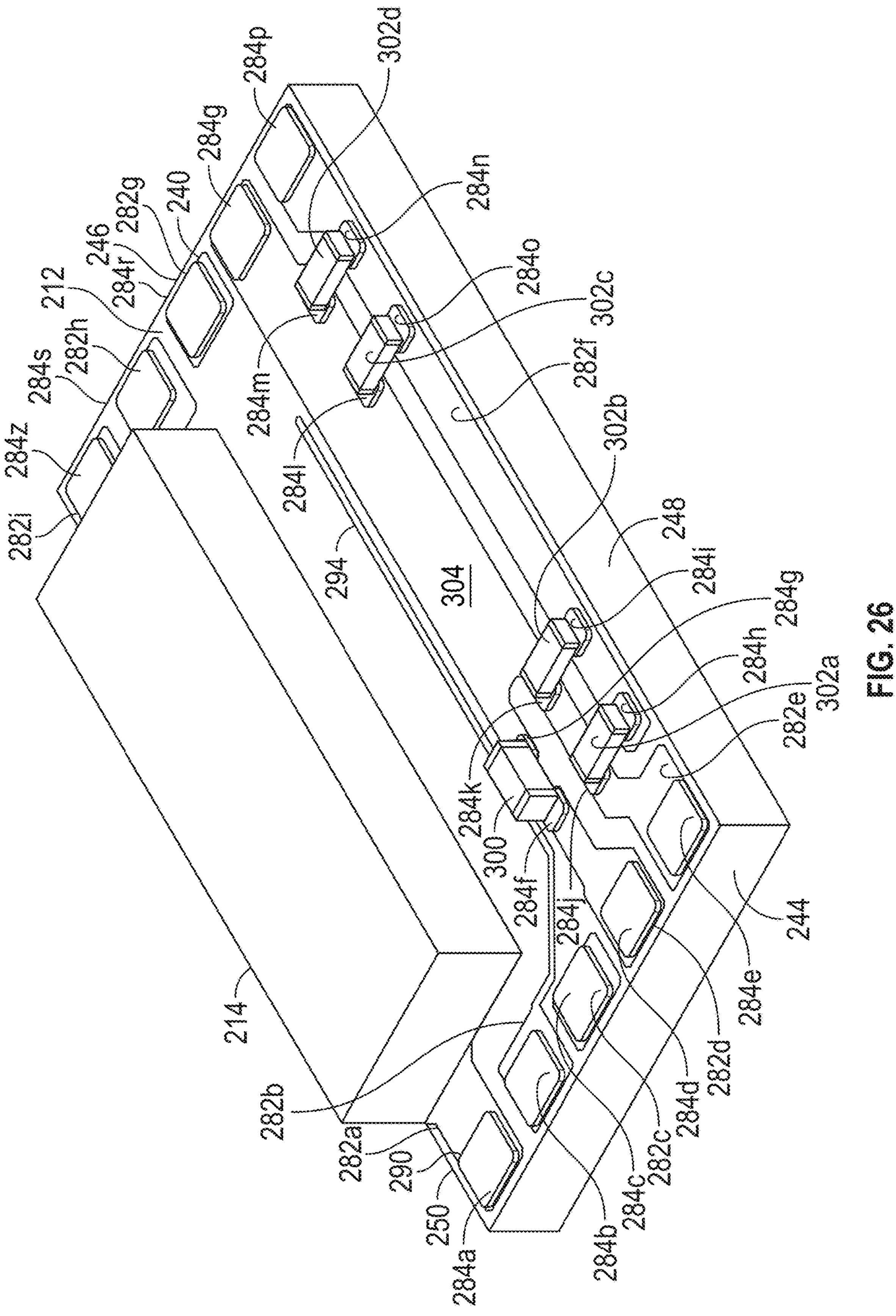
FIG. 26 is a top perspective view of the sample vessel of FIG. 24 having electrical components bonded to the conductive traces to form a circuit.

Referring now to FIGS. 25 and 26, in some embodiments, the sample vessel 212 has a plurality of conductive traces 282 on the outer surface 220. In the example shown, the sample vessel 212 is provided with nine conductive traces 282*a-i*. Each of the conductive traces 282*a-i* is provided with at least one mounting pad 284. In the example shown, the conductive traces 282*a-i* are provided with mounting pads 284*a-t*.

The mounting pads 284*a*, 284*b*, 284*c*, 284*d*, and 284*e* are spaced apart and electrically isolated from each other. The mounting pads 284*a*, 284*b*, 284*c*, 284*d*, and 284*e* are positioned along the first end 244 of the sample vessel 212. The mounting pads 284*a*, 284*b*, 284*c*, 284*d*, and 284*e* are bonded, e.g., soldered, to the mounting pads 276*a-e* so as to provide a mechanical and electrical connection therebetween.

The mounting pads 284*p*, 284*q*, 284*r*, 284*s*, and 284*t* are spaced apart and electrically isolated from each other. The mounting pads 284*p*, 284*q*, 284*r*, 284*s*, and 284*t* are spaced a distance from the mounting pads 284*a*, 284*b*, 284*c*, 284*d*, and 284*e*. For example, the mounting pads 284*p*, 284*q*, 284*r*, 284*s*, and 284*t* may be positioned along the second end 246 of the sample vessel 212. The mounting pads 284*p*, 284*q*, 284*r*, 284*s*, and 284*t* are bonded, e.g., soldered, to the mounting pads 276*f-j* on the support substrate 202 so as to provide a mechanical and electrical connection therebetween.

The conductive traces 282 on the sample vessel 212 may have different constructions and be used for different purposes.

In particular, the conductive trace 282*a* is provided with the mounting pad 284*a*. The conductive trace 282*a* has a first portion 288 within the mounting area of the top 240 designated to receive the piezo transducer 214, and a second portion 290 outside of the mounting area and electrically connected to the mounting pad 284*a*.

The conductive trace 282*b* includes the mounting pad 284*b* in a first sensor portion 294 extending from the mounting pad 284*b*. The first sensor portion 294 extends along the microchannel 222 and is used to form a part of a capacitive sensor that can be used to determine fluid type of an expected channel content, e.g., a sample within the microchannel 222 (e.g., blood), air, or aqueous solution by way of measuring capacitance and correlating the capacitance to known dielectric properties of the expected channel content within the microchannel 222. The dielectric properties of the expected channel content can be empirically determined using techniques known in the art.

The conductive trace 282*c* is contained within the mounting pad 284*c*, and is used solely for connecting the sample vessel 212 to the support substrate 202.

The conductive trace 282*d* includes two of the mounting pads 284*d* and 284*f*. The mounting pad 284*d* may be mechanically and electrically connected to the mounting pad 276*d*. The mounting pad 284*f* may be connected to a lead of an electrical device. In the example shown, the sample vessel 212 may include a thermistor 300 mounted to the mounting pads 284*f* and 284*g* (see FIG. 26). The thermistor 300 senses a temperature of the outer surface 220 of the sample vessel and provides temperature signals to the mounting pads 284*d* and 284*q*.

The conductive trace 282*e* includes six mounting pads 284*e*, 284*j*, 284*k*, 2841, 284*m* and 284*q*. The mounting pads 284*e* and 284*q* may be mechanically and electrically connected to the mounting pads 276*e* and 276*g*. The mounting pads 284*j*, 284*k*, 2841 and 284*m* may each be connected to a lead of an electrical device. In the example shown in FIG. 26, the sample vessel includes four electrical heaters 302*a-d*. The electrical heaters 302*a-d* can be used to generated and provide heat into the sample vessel 212 by supplying electricity to the electrical heaters 302*a-d*. As discussed above, thermal control can be used to keep the patient's blood sample at a constant temperature for accurately measuring the blood sample oximetry analytes. The electrical heaters 302*a-d* can be connected in parallel by way of the mounting pads 284*j*, 284*h*, 284*k*, 284*i*, 2841, 2840, 284*m*, and 284*n*. In this example, the electrical heater 302*a* is connected to mounting pads 284*j* and 284*h*; the electrical heater 302*b* is connected to mounting pads 284*k* and 284*i*; the electrical heater 302*c* is connected to mounting pads 284l and 2840; and the electrical heater 302*d* is connected to mounting pads 284*m* and 284*n*. The conductive trace 282*e* can also be used in combination with the conductive trace 282*b* to form a capacitive sensor. In this regard, the conductive trace 282*e* also includes a second sensor portion 304 that may extend within plus or minus five (5) degrees of parallel (preferably extending parallel) to the first sensor portion 294. In the embodiments shown, the first sensor portion 294 and the second sensor portion 304 are both in a linear configuration and adjacent to but not covering the microchannel 222 so as to not block a beam of light generated by a spectrophotometer as discussed herein. In some embodiments, the first sensor portion 294 and the second sensor portion 304 may be parallel or non-parallel so long as the first sensor portion 294 and the second sensor portion 304 do not block the beam 116, and permit capacitance readings from the first sensor portion 294 and the second sensor portion 304 to be correlated to expected channel contents within the microchannel 222 during calibration. In some embodiments, the first sensor portion 294 and/or the second sensor portion 304 can have a serpentine configuration with one or more portion(s) crossing above the microchannel 222 but outside of an expected path of the beam 116 through the sample vessel 212.

The conductive trace 282*f* includes five mounting pads 284*h*, 284*i*, 284*o*, 284*n*, and 284*p*. The use of the mounting pads 284*h*, 284*i*, 2840, 284*n* has been described above. The mounting pad 284*p* is configured for mechanical and electrical connection to the mounting pad 276*f*.

The conductive traces 282*g*-I are contained within the mounting pads 284*r*, 284*s* and 284*t*, and are used solely for mechanically connecting the sample vessel 212 to the support substrate 202, for example by reflow soldering on standard automated processing equipment used in electronics manufacturing.

In some embodiments, the conductive traces 282*a-t* are formed with a conductive electrode pattern applied with any suitable technique, such as physical vapor deposition, sputter deposition, or the like onto the top 240 of the sample vessel 212. The conductive electrode traces 282*a-t* can be made of any suitable conductive material, such as a metal including, but not limited to, copper, aluminum, or the like.

Referring now to FIG. 24 and FIG. 11B, to make the assembly 200, first and second glass substrates 310, 312 for making the sample vessel 212 can be fabricated on a wafer. The first glass substrate 310 includes a top surface 314 and a bottom surface 316. The top surface 314 of the first glass substrate 310 can be a planar surface and will form the top 240 of the sample vessel 212 when the glass substrates 310, 312 are bonded together. The bottom surface 316 of the first glass substrate 310 may also be a planar surface. In some embodiments, the first glass substrate 310 may be 700 micrometers thick. In some embodiments, the first glass substrate 310 is devoid of the microchannel 222 and the input and output ports 224 and 226. The second glass substrate 312 includes a top surface 320 having the microchannel 222 formed therein. The second glass substrate 312 is also formed with the first port 224 and the second port 226. The microchannel 222, the first port 224 and the second port 226 can be etched into a section of the second glass substrate 312. The bottom surface 316 of the first glass substrate 310 is connected to the top surface 320 of the second glass substrate 312. In some embodiments, the bottom surface 316 of the first glass substrate 310 is connected to the top surface 320 of the second glass substrate 312 by annealing to fully encompass and surround the microchannel 222. In some embodiments, the second glass substrate 312 may be 700 micrometers thick.

The conductive electrode pattern is applied to the first glass substrates 310 (or 70 shown in FIG. 11A) intended for use as the top 240 while the glass substrates 310, 312 are a part of the wafer. Electrical components, such as the thermistor 300, and the electrical heaters 302*a-d* are soldered to predetermined mounting pads 284 of the conductive traces 282. The substrates 310, 312 are then diced-singulated from the wafer. Corresponding pairs of the substrates 310, 312 are bonded together so that the first substrate 310 covers the microchannel 222 within the second substrate 312 to form the sample vessel 212. As shown in FIGS. 24 and 26, the piezo transducer 214 has a smaller size than the size of glass substrates 310, 312, where a peripheral portion of the piezo transducer 214 is mounted to the portions of the conductive electrode pattern, including the first portion 288 of the conductive trace 282*a*, such that portions of the periphery of the piezo transducer 214 are indirectly bonded to the top surface 314 of the first glass substrate 310, leaving a majority of the piezo transducer 214 available for directly bonding to the top surface 314 in a bonding zone 317 of the first glass substrate 310 shown in FIG. 25. That is, the conductive electrode pattern covers a portion of the top surface 314 of the first glass substrate 310 leaving the bonding zone 317, i.e., another portion of the top surface 314 of the first glass substrate 310, exposed for being directly bonded to the piezo transducer 214. FIG. 26 shows the sample vessel 212 where the piezo transducer 214 does not extend beyond the surface area of the glass substrates 310, 312 when the monolithic structure is formed. As shown in FIG. 24, the piezo transducer 214 is positioned in the mounting area overlapping the first portion 288 of the conductive trace 282*a*, and then bonded to the first glass substrate 310 using any suitable epoxy 318, such as EPO-Tek 353-ND. A sample inlet 320 is inserted into the first port 224 and bonded to the bottom 242 of the sample vessel 212 with an epoxy 330, such as an epoxy sold under the brandname LOCKTITE 444. A sample outlet 322 is inserted into the second port 226 and bonded to the bottom 242 of the sample vessel 212 with an epoxy 332, such as an epoxy sold under the brandname LOCKTITE 444. Once the sample inlet 320 and the sample outlet 322 are connected to the sample vessel 212, then the mounting pads 284*a-e*, and 284*p-t* are then soldered to the mounting pads 276*a-j* to mechanically and electrically connect the sample vessel 212 to the support substrate 202. Then, a flexible wire 340 is soldered to the mounting pad 276*k* and a terminal on the piezo transducer 214.

In use, the assembly 200 may be a component of the analyzer 100. The analyzer 100 may comprise the assembly 200, the absorbance spectrophotometer 102, the fluidic distribution system 104 (for example, including a peristatic pump), and/or the controller 106 as described above. In one embodiment, the male edge connector, e.g., the connector portions 275 adjacent to the other peripheral edge 264 (as shown in FIG. 27) are plugged into a female edge connector of the analyzer 100. In this position, the microchannel 222 (or 22 shown in FIG. 15) is positioned between the transmitter 112 and the receiver 114 of the absorbance spectrophotometer 102 of the analyzer 100. The assembly 200 may be removeable and/or exchangeable from the other components of the analyzer 100.

Once the male edge connector is plugged into the female edge connector of the analyzer 100, the controller 106 is in circuit with the piezo transducer 214, the thermistor 300, the heaters 302*a-d*, the first sensor portion 294 and the second sensor portion 304. The controller 106 is configured to control the frequency and/or voltage of the alternating current signal supplied to the piezo transducer 214. Additionally, the controller 106 is configured to control the temperature of the sample vessel 212 by supplying current to the heaters 302*a-d* and receiving temperature feedback from the thermistor 300. The amount of current supplied to the heaters 302*a-d* can be varied to obtain a desired temperature of the sample vessel.

Figure 29:
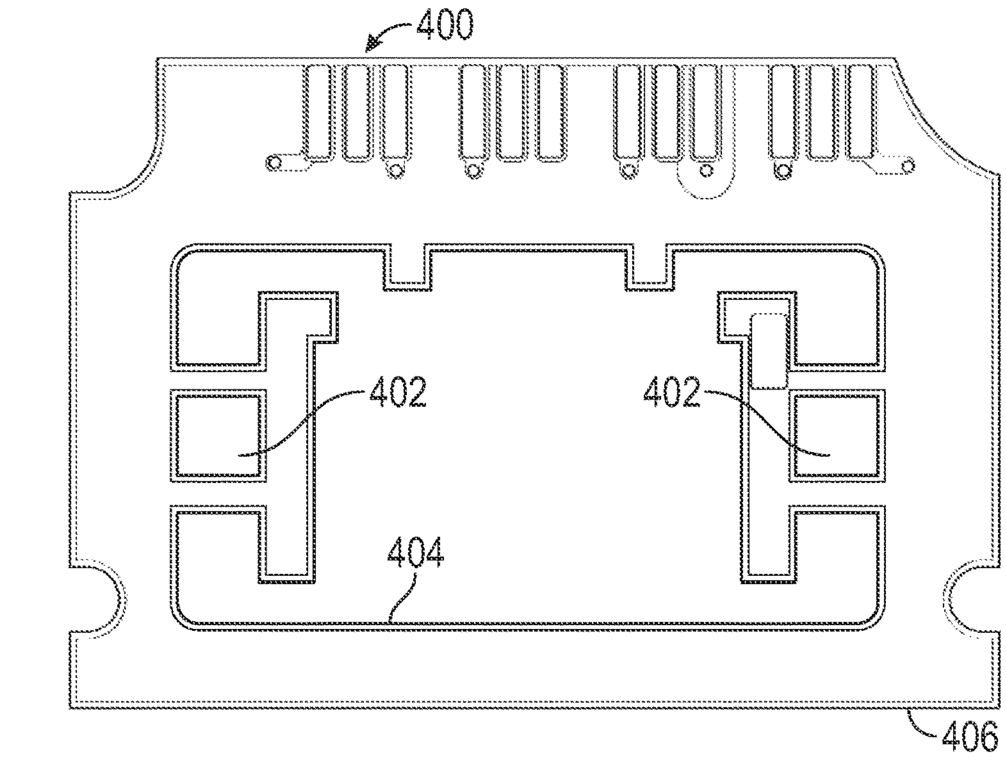
FIG. 29 is a top perspective view of another support substrate constructed in accordance with the present disclosure.

Shown in FIG. 29, and designated with a reference numeral 400, is another embodiment of a support substrate constructed in accordance with the present disclosure. The support substrate 400 is identical in construction and use as the support substrate 202 with the exception that the support substrate 400 is provided with at least one non-via opening 402 between an inner edge 404 and an outer edge 406, this non-via opening 402 may not be used for providing electrical connections between layers or surfaces of the support substrate 400, but rather refers to a means of constraining the sample vessel 212 such that it is minimally dampened but electrical contact persists.

Figure 30:
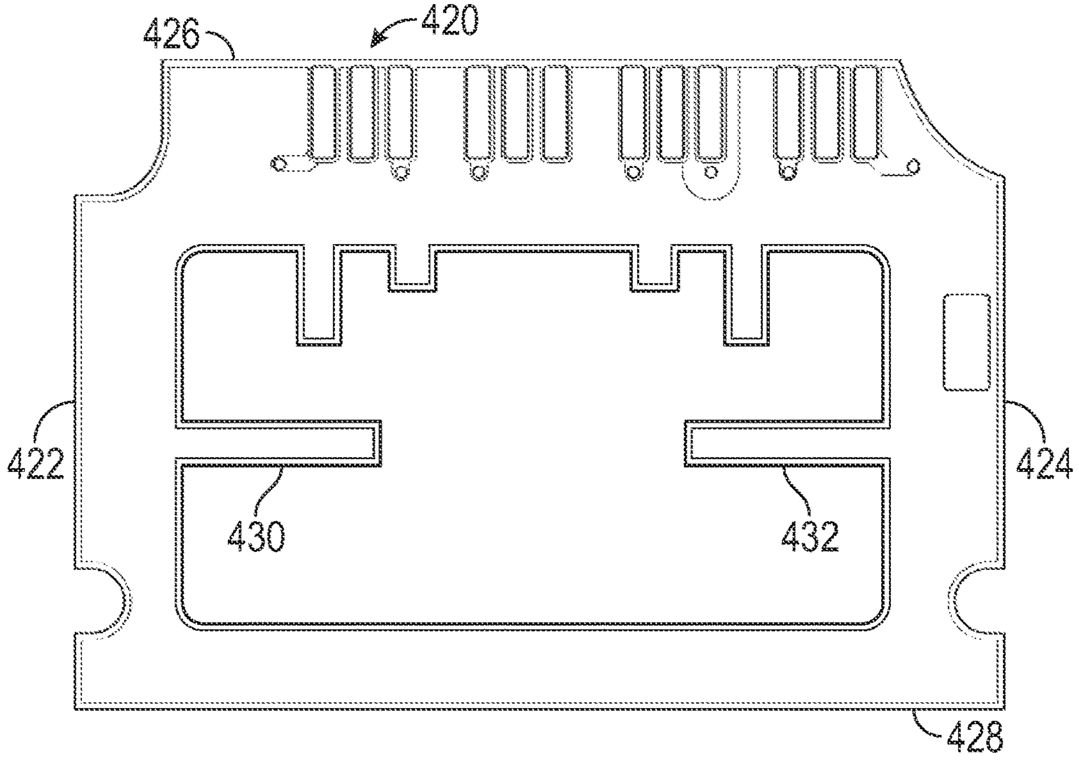
FIG. 30 is a top perspective view of yet another support substrate constructed in accordance with the present disclosure.

Shown in FIG. 30, and designated with a reference numeral 420 is another embodiment of a support substrate constructed in accordance with the present disclosure. The support substrate 420 is provided with a first side 422, a second side 424, a first end 426 and a second end 428. The support substrate 420 is identical in construction and use as the support substrate 202 with the exception that the support substrate 420 includes a first tab 430 connected to the first side 422, and a second tab 432 connected to the second side 424 with the first tab 430 and the second tab 432 extended toward each other. These tabs serve as a means of making minimal mass interface contact with the sample vessel 212 and help to minimize acoustic damping.

Figure 31:
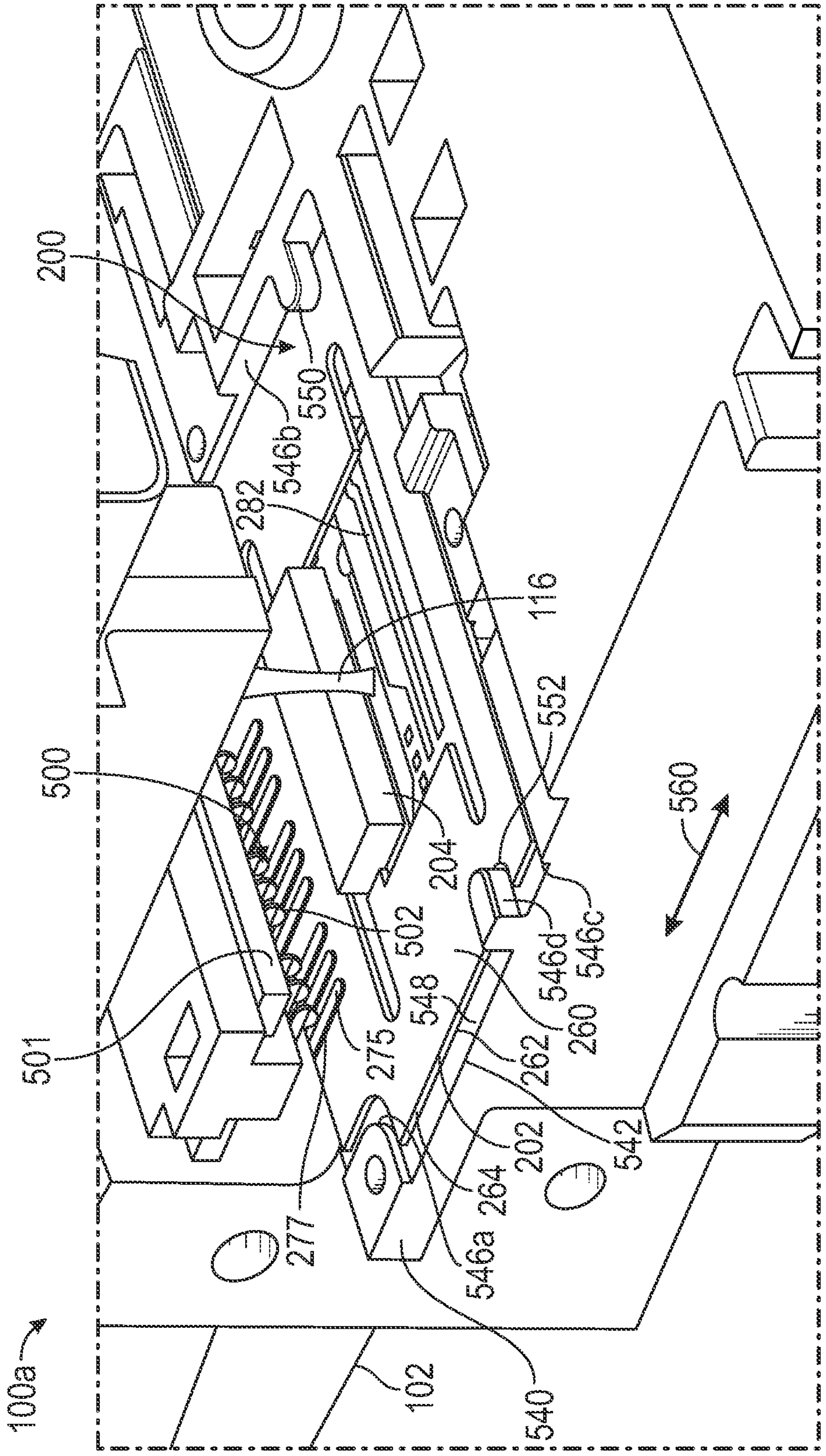
FIG. 31 is a partial perspective view of an exemplary analyzer in accordance with the present disclosure.

Referring now to FIG. 31, in some embodiments, the assembly 200, may be a component of an analyzer 100*a*. The analyzer 100*a* is similar in construction and function as the analyzer 100 described above with reference to FIGS. 15-18, except that the analyzer 100*a* includes an edge connector 500 that will be described herein by way of example as a female edge connector 500 configured to mechanically and electrically connect with the male edge connector 277 of the support substrate 202. Common elements between the analyzers 100 and 100*a* have been labeled in FIG. 31. Also, while support substrate 202 is referred to in FIG. 31, it should be understood that the support substrate may be that of support substrate 400 or 420. As discussed above with reference to FIGS. 23 and 27, the connector portions 275 are provided adjacent to the outer peripheral edge 264. The connector portions 275 may be provided on the upper surface 260 and/or the lower surface 262 of the support substrate 202. In the example shown in FIG. 31, the connector portions 275 are provided on the upper surface 260. In this embodiment, the connector portions 275 are coplanar. The connector portions 275 are spaced apart along at least a portion of the outer peripheral edge 264. The female edge connector 500 may be provided with a support member 501 connected to a plurality of spring contacts 502 constructed of an electrically conductive material. In the example shown, the female edge connector 500 is provided with nine spring contacts 502, with each of the spring contacts 502 positioned to contact a particular one of the connector portions 275. Each of the spring contacts 502 may be biased downwardly (in the example shown) and spaced apart from either one or two adjacently disposed spring contacts 502. The spacing of the spring contacts 502 may be predetermined to match the spacing of the connector portions 275. The spring contacts 502 are conductive and are electrically connected with other electrical components of the analyzer 100*a*, such as the controller 106. To electrically connect the assembly 200 with the other electrical components of the analyzer 100*a*, the male edge connector 277 is biased against the spring contacts 502. Continued movement of the male edge connector 277 towards the spring contacts 502 allows the spring contacts 502 to contact the connector portions 275. Movement of the male edge connector 277 in an opposite direction away from the spring contacts 502 allows disconnection of the assembly 200 from the analyzer 100*a*.

To support the assembly 200 in the analyzer 100*a*, the analyzer 100*a* is supplied with a carriage 540 having an upper surface 542. The carriage 540 has a plurality of walls 546 at least partially defining a recess 548. In the embodiment shown, the carriage 540 includes walls 546*a*, 546*b*, 546*c* and 546*d*. The assembly 200 is positioned within the recess 548 and is supported by the upper surface 542. More particularly, at least two of the walls 546*a-d* are configured to matingly engage the outer peripheral edge 264 of the support substrate 202. In the example shown, the walls 546*b* and 546*d* are in the forms of tabs. The support substrate 202 is shaped so that the outer peripheral edge 264 forms a first recess 550 and a second recess 552. Wall 546*b* is positioned within the first recess 550 and wall 546*d* is positioned within the second recess 552. Positioning the wall 546*b* within the first recess 550 and the wall 546*d* within the second recess 552 registers the assembly 200 precisely within the carriage 540.

The carriage 540 is movable toward and away from the female edge connector 500 as shown by the arrows 560. More specifically, to install the assembly 200 in the analyzer 100*a*, the carriage 540 is moved away from the female edge connector 500 so that the assembly 200 may be placed within the recess 548 without the male edge connector 277 engaging the female edge connector 500. Once the assembly 200 is positioned within the recess 548, the carriage 540 is moved towards the female edge connector 500 so as to engage the male edge connector 277 with the female edge connector 500.

In some non-limiting embodiments, the carriage 540 is supported by a guide assembly (not shown) and moved with a motorized control system. The guide assembly may include tracks, wheels and/or bearings.

The following is a number list of non-limiting illustrative embodiments of the inventive concept disclosed herein:

1. An acoustophoresis device, comprising:

a sample vessel having an outer surface, a microchannel within confines of the outer surface, a first port extending through the outer surface to the microchannel, and a second port extending through the outer surface to the microchannel, the microchannel being configured to receive a blood sample through the first port, the sample vessel having conductive traces on the outer surface; and a piezo transducer formed on the outer surface of the sample vessel to form a monolithic structure, the piezo transducer contacting at least one of the conductive traces, the piezo transducer configured to generate ultrasonic waves inside a sample in the microchannel, the piezo transducer having an excitation input and response signal output electrically connected to the at least one of the conductive traces.

2. The acoustophoresis device of illustrative embodiment 1, wherein the sample vessel is constructed of glass.

3. The acoustophoresis device of any one of illustrative embodiments 1-2, wherein the sample vessel includes a first substrate bonded to the piezo transducer and a second substrate having the microchannel, the first port and the second port.

4. The acoustophoresis device of any one of illustrative embodiments 1-3, wherein the microchannel has a length, a width and a height, wherein the microchannel has a first side extending along the length of the microchannel, and a second side extending along the length of the microchannel, wherein a first conductive trace of the conductive traces includes a first mounting pad and a first sensor portion, the first sensor portion extending along the first side of the microchannel, and wherein a second conductive trace of the conductive traces includes a second mounting pad and a second sensor portion, the second sensor portion extending along the second side of the microchannel.

5. The acoustophoresis device of any one of illustrative embodiments 1-4, wherein the outer surface is a first outer surface having a mounting area, the mounting area having a first shape, at least one of the conductive traces having a first portion within the mounting area and a second portion outside of the mounting area, and wherein the piezo transducer has a second outer surface having a second shape corresponding to the first shape, the second outer surface of the piezo transducer bonded to the mounting area.

6. The acoustophoresis device of any one of illustrative embodiments 1-5, wherein at least one of the conductive traces is positioned between the piezo transducer and the outer surface of the sample vessel.

7. The acoustophoresis device of any one of illustrative embodiments 1-6, wherein the conductive traces are in direct contact with and bonded to the outer surface of the sample vessel.

8. The acoustophoresis device of any one of illustrative embodiments 1-7, wherein the sample vessel has an outer perimeter and wherein the conductive traces include conductive mounting pads located adjacent to the outer perimeter.

9. The acoustophoresis device of any one of illustrative embodiments 1-8, wherein the sample vessel has a first end and a second end, wherein the conductive traces include conductive mounting pads located adjacent to at least one of the first end and the second end of the sample vessel.

10. The acoustophoresis device of any one of illustrative embodiments 1-9, further comprising an electrical component, and wherein the sample vessel has an outer perimeter, wherein a first conductive trace of the conductive traces includes a first mounting pad, and a second mounting pad electrically connected to the first mounting pad, wherein a second conductive trace of the conductive traces includes a third mounting pad, and a fourth mounting pad electrically connected to the third mounting pad, the first mounting pad and the third mounting pad being positioned adjacent to the outer perimeter, and the electrical component having a first lead connected to the second mounting pad and a second lead connected to the fourth mounting pad.

11. The acoustophoresis device of any one of illustrative embodiments 1-10, wherein the electrical component is a thermistor.

12. The acoustophoresis device of any one of illustrative embodiments 1-11, wherein the second mounting pad has a first length and a first width with the first length being greater than the first width, and the fourth mounting pad has a second length and a second width with the second length being greater than the second width, and wherein the first length and the second length extend within 5 degrees of parallel.

13. The acoustophoresis device of any one of illustrative embodiments 1-12 wherein the electrical component includes a first electrical heater and a second electrical heater, and wherein the first electrical heater and the second electrical heater are connected in parallel to the second mounting pad and the fourth mounting pad.

14. An assembly, comprising:

a support substrate;

an acoustophoresis device permanently bonded to the support substrate, the acoustophoresis device comprising:

a sample vessel having an outer surface, a microchannel within confines of the outer surface, a first port extending through the outer surface to the microchannel, and a second port extending through the outer surface to the microchannel, such that a blood sample is insertable through the first port into the microchannel, the sample vessel having conductive traces on the outer surface; and a piezo transducer bonded to the outer surface of the sample vessel to form a monolithic structure, the piezo transducer contacting at least one of the conductive traces, the piezo transducer configured to generate ultrasonic standing waves inside the blood sample in the microchannel, the piezo transducer having a power input electrically connected to at least one of the conductive traces.

15. The assembly of any one of the preceding illustrative embodiments, wherein the support substrate includes an upper surface, a lower surface opposite the upper surface, and an outer peripheral edge, the support substrate having an inner edge defining an opening intersecting the upper surface and the lower surface, the sample vessel connected to one of the upper surface and the lower surface.

16. The assembly of any one of the preceding illustrative embodiments, wherein the support substrate includes a predetermined pattern of conductive traces on at least one of the upper surface and the lower surface, and wherein at least some of the conductive traces include a mounting pad, and wherein at least two of the mounting pads are bonded to the sample vessel.

17. The assembly of any one of the preceding illustrative embodiments, wherein the conductive traces are first conductive traces and the mounting pads are first mounting pads, and wherein the sample vessel has a plurality of second conductive traces on the outer surface having second mounting pads, and wherein the first mounting pads are bonded to the second mounting pads.

18. The assembly of any one of the preceding illustrative embodiments, wherein the first mounting pads are soldered to the second mounting pads.

19. The assembly of illustrative embodiments 17 or 18, wherein the first mounting pads are positioned adjacent to the inner edge.

20. The assembly of any one of the preceding illustrative embodiments, wherein the support substrate is a circuit board.

21. The assembly of any one of the preceding illustrative embodiments, wherein the piezo transducer extends through the opening in the support substrate.

22. An analyzer, comprising:

an acoustophoresis device, comprising:

a sample vessel having an outer surface, a microchannel within confines of the outer surface, a first port extending through the outer surface to the microchannel, and a second port extending through the outer surface to the microchannel, such that a sample is insertable through the first port into the microchannel, the sample vessel having conductive traces on the outer surface; and a piezo transducer bonded to the outer surface of the sample vessel to form a monolithic structure, the piezo transducer contacting at least one of the conductive traces, the piezo transducer configured to generate ultrasonic waves inside the sample in the microchannel and configured to vibrate the sample vessel such that shear forces are induced within the microchannel;

an absorbance spectrophotometer comprising a transmitter and a receiver positioned adjacent to the sample vessel, the transmitter positioned to emit a light beam through the microchannel, and a receiver positioned to receive at least a portion of the light beam after the portion of the light beam has passed through the microchannel;

a fluidic distribution system having an outlet connected to the first port, and an inlet connected to the second port; and a controller electrically connected to the piezo transducer and configured to provide electrical signals to the piezo transducer that when received by the piezo transducer cause the piezo transducer to emit ultrasonic waves and cause the piezo transducer to contract and elongate.

23. The analyzer of illustrative embodiment 22, wherein the outer surface of the sample vessel has a first side, and a second side opposite the first side, the transmitter being positioned on the first side of the sample vessel, and the receiver being positioned on the second side of the sample vessel, the sample vessel being constructed of a material transparent to the light beam.

24. The analyzer of any one of the preceding illustrative embodiments, wherein the outer surface of the sample vessel has a first side, and a second side opposite the first side, the first side and the second side being planar.

25. The analyzer of any one of the preceding illustrative embodiments, wherein the sample vessel is constructed of glass.

26. The analyzer of any one of the preceding illustrative embodiments, wherein the sample vessel is constructed of a non-glass material having a Young's modulus within a range from about 50 Gpa to 90 Gpa.

27. The analyzer of any one of the preceding illustrative embodiments, wherein the outer surface of the sample vessel is a first outer surface having a mounting area, the mounting area having a first shape, and wherein the piezo transducer has a second outer surface having a second shape corresponding to the first shape, the second outer surface of the piezo transducer bonded to the mounting area.

28. The analyzer of any one of illustrative embodiments 22-27, wherein the piezo transducer matingly engages the outer surface of the sample vessel.

29. The analyzer of any one of illustrative embodiments 22-28, wherein the height of the microchannel is about 100 micrometers and the width of the microchannel is about two millimeters.

30. The analyzer of any one of illustrative embodiments 22-30, further comprising a support substrate including an upper surface, a lower surface opposite the upper surface, and an outer peripheral edge, the support substrate having an inner edge defining an opening intersecting the upper surface and the lower surface, the sample vessel connected to one of the upper surface and the lower surface.

31. The analyzer of any one of the preceding illustrative embodiments, wherein the support substrate includes a predetermined pattern of conductive traces on at least one of the upper surface and the lower surface, and wherein at least some of the conductive traces include a mounting pad, and wherein at least two of the mounting pads are bonded to the sample vessel.

32. The analyzer of any one of the preceding illustrative embodiments, wherein the conductive traces are first conductive traces and the mounting pads are first mounting pads, and wherein the sample vessel has a plurality of second conductive traces on the outer surface having second mounting pads, and wherein the first mounting pads are bonded to the second mounting pads.

33. The analyzer of any one of the preceding illustrative embodiments, wherein the first mounting pads are soldered to the second mounting pads.

34. The analyzer of any one of the preceding illustrative embodiments, wherein the first mounting pads are positioned adjacent to the inner edge.

35. The analyzer of any one of the preceding illustrative embodiments, wherein the support substrate is a circuit board.

36. The analyzer of any one of the preceding illustrative embodiments, wherein the piezo transducer extends through the opening in the support substrate.

37. The analyzer of any one of the preceding illustrative embodiments, wherein the support substrate includes a predetermined pattern of conductive traces on at least one of the upper surface and the lower surface, and wherein at least some of the conductive traces include a plurality of connector portions provided adjacent to the outer peripheral edge.

38. The analyzer of any one of the preceding illustrative embodiments, further comprising an edge connector, the edge connector comprising a support member connected to a plurality of spring contacts, the spring contacts being constructed of electrically conductive material in communication with the controller, particular ones of the spring contacts engaging particular ones of the connector portions to provide an electrical connection between the conductive traces of the support substrate and the spring contacts.

39. A method of making an acoustophoresis device, comprising:

bonding a piezo transducer to an outer surface of a sample vessel to form a monolithic structure such that a first portion of a conductive trace extends between the piezo transducer and the outer surface of the sample vessel, the sample vessel having a microchannel within confines of the outer surface, a first port extending through the outer surface to the microchannel, a second port extending through the outer surface to the microchannel, the microchannel having a length, a width and a height.

40. The method of illustrative embodiment 39, further comprising the steps of: bonding conductive traces to an outer surface of the sample vessel; and connecting at least a portion of the conductive traces on the outer surface of the sample vessel to mounting pads of conductive traces on a piezo transducer.

41. The method of any one of the preceding illustrative embodiments, wherein the support substrate has an opening, and the step of connecting at least a portion of the conductive traces to the support substrate includes positioning the sample vessel to span the opening and then connecting at least a portion of the conductive traces to the support substrate.

42. The method of any one of the preceding illustrative embodiments, wherein mounting pads of conductive traces on the outer surface of the sample vessel are soldered to mounting pads of conductive traces on the support substrate.

CONCLUSION

As discussed above, the assembly 200 is provided with the support substrate 202, 400 or 420 and an acoustophoresis device 204 that is preferably permanently bonded to the support substrate 202, 400 or 420 in a non-clamping manner. The acoustophoresis device 204 may be attached to the support substrate 202, 400 or 420 in a manner to permit the acoustophoresis device 204 to vibrate more freely than if the acoustophoresis device 204 was connected to the support substrate 202, 400 or 420 with a clamping method. Further, the acoustophoresis device 204 may be attached to the support substrate 202 in a manner that provides a near zero mass interface that provides for efficient excitation (e.g., voltage less than 150Vp-p, and in some embodiments between 80Vp-p and 100Vp-p) and response signals having a high signal to noise ratio. The support substrate 202, 400 or 420, for example, may be a printed circuit board and includes the predetermined pattern of conductive traces 274 on at least one of the upper surface 260 and the lower surface 262 of the support substrate 202, 400 or 420 which allows electrical connections to components on the support substrate 202, 400 or 420 and the acoustophoresis device 204 without wires.

The assembly 200 can be a consumable that is user replaceable or single use disposable cartridge discarded after a single use, as is desired. Additionally, the assembly 200 allows the entire microchannel 222 to be self-contained for heating, hemolysis, and fluid detection. The microchannel 222 being contained within the assembly 200 enhances the uniformity of the microchannel 222 thereby enhancing the accuracy of readings of the blood samples taken within the microchannel 222 by the analyzer 100, **100*a*. Finally, the assembly 200 allows for the near zero mass interface connection of the acoustophoresis device 204 to the support substrate 202, 400 or 420 while still making electrical connections with the conductive traces 282 and without wires that are unbonded to the sample vessel 212** along the wires' length. This provides the advantage of easier and less expensive fabrication, as well as more reliable electrical interfaces and enhanced signal integrity.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features and steps are recited in the claims and/or disclosed in the specification, these combinations are not intended to limit the disclosure. In fact, many of these features and steps may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An acoustophoresis device, comprising:

a sample vessel having an outer surface, a microchannel within confines of the outer surface, a first port extending through the outer surface to the microchannel, and a second port extending through the outer surface to the microchannel, the microchannel being configured to receive a blood sample through the first port; the sample vessel having conductive traces on the outer surface; and a piezo transducer formed on the outer surface of the sample vessel to form a monolithic structure, the piezo transducer contacting at least one of the conductive traces, the piezo transducer configured to generate ultrasonic waves inside the blood sample in the microchannel, the piezo transducer having an excitation input and response signal output electrically connected to the at least one of the conductive traces.

2. The acoustophoresis device of claim 1, wherein the sample vessel is constructed of glass.

3. The acoustophoresis device of claim 1, wherein the sample vessel includes a first substrate bonded to the piezo transducer and a second substrate having the microchannel, the first port and the second port.

4. The acoustophoresis device of claim 1, wherein the microchannel has a length, a width and a height, wherein the microchannel has a first side extending along the length of the microchannel, and a second side extending along the length of the microchannel, wherein a first conductive trace of the conductive traces includes a first mounting pad and a first sensor portion, the first sensor portion extending along the first side of the microchannel, and wherein a second conductive trace of the conductive traces includes a second mounting pad and a second sensor portion, the second sensor portion extending along the second side of the microchannel.

5. The acoustophoresis device of claim 1, wherein the outer surface is a first outer surface having a mounting area, the mounting area having a first shape, at least one of the conductive traces having a first portion within the mounting area and a second portion outside of the mounting area, and wherein the piezo transducer has a second outer surface having a second shape corresponding to the first shape, the second outer surface of the piezo transducer bonded to the mounting area.

6. The acoustophoresis device of claim 1, wherein at least one of the conductive traces is positioned between the piezo transducer and the outer surface of the sample vessel.

7. The acoustophoresis device of claim 1, wherein the conductive traces are in direct contact with and bonded to the outer surface of the sample vessel.

8. The acoustophoresis device of claim 1, wherein the sample vessel has an outer perimeter and wherein the conductive traces include conductive mounting pads located adjacent to the outer perimeter.

9. The acoustophoresis device of claim 1, wherein the sample vessel has a first end and a second end, wherein the conductive traces include conductive mounting pads located adjacent to at least one of the first end and the second end of the sample vessel.

10. The acoustophoresis device of claim 1, further comprising an electrical component, and wherein the sample vessel has an outer perimeter, wherein a first conductive trace of the conductive traces includes a first mounting pad, and a second mounting pad electrically connected to the first mounting pad, wherein a second conductive trace of the conductive traces includes a third mounting pad, and a fourth mounting pad electrically connected to the third mounting pad, the first mounting pad and the third mounting pad being positioned adjacent to the outer perimeter, and the electrical component having a first lead connected to the second mounting pad and a second lead connected to the fourth mounting pad.

11. The acoustophoresis device of claim 10, wherein the electrical component is a thermistor.

12. The acoustophoresis device of claim 10, wherein the second mounting pad has a first length and a first width with the first length being greater than the first width, and the fourth mounting pad has a second length and a second width with the second length being greater than the second width, and wherein the first length and the second length extend within five degrees of parallel.

13. The acoustophoresis device of claim 12, wherein the electrical component includes a first electrical heater and a second electrical heater, and wherein the first electrical heater and the second electrical heater are connected in parallel to the second mounting pad and the fourth mounting pad.

14. An assembly, comprising:

a support substrate; and an acoustophoresis device bonded to the support substrate, the acoustophoresis device comprising:

a sample vessel having an outer surface, a microchannel within confines of the outer surface, a first port extending through the outer surface to the microchannel, and a second port extending through the outer surface to the microchannel, such that a blood sample is insertable through the first port into the microchannel, the sample vessel having conductive traces on the outer surface; and a piezo transducer bonded to the outer surface of the sample vessel to form a monolithic structure, the piezo transducer contacting at least one of the conductive traces, the piezo transducer configured to generate ultrasonic standing waves inside the blood sample in the microchannel, the piezo transducer having an excitation signal input and response signal output electrically connected to at least one of the conductive traces.

15. The assembly of claim 14, wherein the support substrate includes an upper surface, a lower surface opposite the upper surface, and an outer peripheral edge, the support substrate having an inner edge defining an opening intersecting the upper surface and the lower surface, the sample vessel connected to one of the upper surface and the lower surface.

16. The assembly of claim 15, wherein the support substrate includes a predetermined pattern of conductive traces on at least one of the upper surface and the lower surface, and wherein at least some of the conductive traces include a mounting pad, and wherein at least two of the mounting pads are bonded to the sample vessel.

17. The assembly of claim 16, wherein the conductive traces are first conductive traces and the mounting pads are first mounting pads, and wherein the sample vessel has a plurality of second conductive traces on the outer surface having second mounting pads, and wherein the first mounting pads are bonded to the second mounting pads.

18. The assembly of claim 17, wherein the first mounting pads are soldered to the second mounting pads.

19. The assembly of claim 17, wherein the first mounting pads are positioned adjacent to the inner edge.

20. The assembly of claim 15, wherein the piezo transducer extends through the opening in the support substrate.

21. The assembly of claim 14, wherein the support substrate is a circuit board.

22. An analyzer, comprising:

an acoustophoresis device, comprising:

a sample vessel having an outer surface, a microchannel within confines of the outer surface, a first port extending through the outer surface to the microchannel, and a second port extending through the outer surface to the microchannel, such that a sample is insertable through the first port into the microchannel, the sample vessel having conductive traces on the outer surface; and a piezo transducer bonded to the outer surface of the sample vessel to form a monolithic structure, the piezo transducer contacting at least one of the conductive traces, the piezo transducer configured to generate ultrasonic waves inside the sample in the microchannel and configured to vibrate the sample vessel such that shear forces are induced within the microchannel;

an absorbance spectrophotometer comprising a transmitter and a receiver positioned adjacent to the sample vessel, the transmitter positioned to emit a light beam through the microchannel, and a receiver positioned to receive at least a portion of the light beam after the portion of the light beam has passed through the microchannel;

a fluidic distribution system having an outlet connected to the first port, and an inlet connected to the second port; and a controller electrically connected to the piezo transducer and configured to provide electrical signals to the piezo transducer that when received by the piezo transducer cause the piezo transducer to emit ultrasonic waves and cause the piezo transducer to contract and elongate.

23. The analyzer of claim 22, wherein the outer surface of the sample vessel has a first side, and a second side opposite the first side, the transmitter being positioned on the first side of the sample vessel, and the receiver being positioned on the second side of the sample vessel, the sample vessel being constructed of a material transparent to the light beam.

24. The analyzer of claim 22, wherein the outer surface of the sample vessel has a first side, and a second side opposite the first side, the first side and the second side being planar.

25. The analyzer of claim 22, wherein the sample vessel is constructed of glass.

26. The analyzer of claim 22, wherein the sample vessel is constructed of a non-glass material having a Young's modulus within a range from 50 Gpa to 90 Gpa.

27. The analyzer of claim 22, wherein the outer surface of the sample vessel is a first outer surface having a mounting area, the mounting area having a first shape, and wherein the piezo transducer has a second outer surface having a second shape corresponding to the first shape, the second outer surface of the piezo transducer bonded to the mounting area.

28. The analyzer of claim 22, wherein the piezo transducer matingly engages the outer surface of the sample vessel.

29. The analyzer of claim 22, wherein the height of the microchannel is 100 micrometers and the width of the microchannel is two millimeters.

30. The analyzer of claim 22, further comprising a support substrate including an upper surface, a lower surface opposite the upper surface, and an outer peripheral edge, the support substrate having an inner edge defining an opening intersecting the upper surface and the lower surface, the sample vessel connected to one of the upper surface and the lower surface.

31. The analyzer of claim 30, wherein the support substrate is a circuit board.

32. The analyzer of claim 30, wherein the support substrate includes a predetermined pattern of conductive traces on at least one of the upper surface and the lower surface, and wherein at least some of the conductive traces include a mounting pad, and wherein at least two of the mounting pads are bonded to the sample vessel.

33. The analyzer of claim 32, wherein the conductive traces are first conductive traces and the mounting pads are first mounting pads, and wherein the sample vessel has a plurality of second conductive traces on the outer surface having second mounting pads, and wherein the first mounting pads are bonded to the second mounting pads.

34. The analyzer of claim 33 wherein the first mounting pads are soldered to the second mounting pads.

35. The analyzer of claim 33, wherein the first mounting pads are positioned adjacent to the inner edge.

36. The analyzer of claim 30, wherein the piezo transducer extends through the opening in the support substrate.

37. The analyzer of claim 30, wherein the support substrate includes a predetermined pattern of conductive traces on at least one of the upper surface and the lower surface, and wherein at least some of the conductive traces include a plurality of connector portions provided adjacent to the outer peripheral edge.

38. The analyzer of claim 37, further comprising an edge connector, the edge connector comprising a support member connected to a plurality of spring contacts, the spring contacts being constructed of electrically conductive material in communication with the controller, particular ones of the spring contacts engaging particular ones of the connector portions to provide an electrical connection between the conductive traces of the support substrate and the spring contacts.

39. A method of making an acoustophoresis device, comprising:

bonding a piezo transducer to an outer surface of a sample vessel to form a monolithic structure such that a first portion of a conductive trace extends between the piezo transducer and the outer surface of the sample vessel, the sample vessel having a microchannel within confines of the outer surface, a first port extending through the outer surface to the microchannel, a second port extending through the outer surface to the microchannel, the microchannel having a length, a width and a height.

40. The method of claim 39, further comprising the steps of:

bonding conductive traces to an outer surface of the sample vessel; and connecting at least a portion of the conductive traces on the outer surface of the sample vessel to mounting pads of conductive traces on a piezo transducer.

41. The method of claim 40, comprising: connecting at least a portion of the conductive traces to a support substrate including positioning the sample vessel to span an opening of the support substrate and then connecting at least a portion of the conductive traces to the support substrate.

42. The method of claim 40, wherein mounting pads of conductive traces on the outer surface of the sample vessel are soldered to mounting pads of conductive traces on a support substrate.

* * * * *